United States Patent
Chase

(10) Patent No.: US 6,332,143 B1
(45) Date of Patent: Dec. 18, 2001

(54) SYSTEM FOR CONNOTATIVE ANALYSIS OF DISCOURSE

(75) Inventor: Wayne O. Chase, Vancouver (CA)

(73) Assignee: Roedy Black Publishing Inc., Vancouver (CA)

( * ) Notice: Subject to any disclaimer, the term of this patent is extended or adjusted under 35 U.S.C. 154(b) by 0 days.

(21) Appl. No.: 09/372,737

(22) Filed: Aug. 11, 1999

(51) Int. Cl.[7] .................................................. G06F 17/30
(52) U.S. Cl. ................................................ 707/100; 704/1
(58) Field of Search ............................. 707/5, 1; 704/1, 704/9, 10; 434/236, 169

(56) References Cited

U.S. PATENT DOCUMENTS

| | | | |
|---|---|---|---|
| 4,384,329 | 5/1983 | Rosenbaum et al. | 364/300 |
| 4,712,174 | 12/1987 | Minkler, II | 364/200 |
| 4,724,523 | 2/1988 | Kucera | 364/419 |
| 4,914,590 | 4/1990 | Loatman et al. | 364/419 |
| 4,931,935 | 6/1990 | Ohira et al. | 364/419 |
| 5,153,830 | 10/1992 | Fisher et al. | 364/419 |
| 5,200,893 | 4/1993 | Ozawa et al. | 364/419 |
| 5,404,299 | 4/1995 | Tsurubayashi et al. | 364/419.11 |
| 5,424,945 * | 6/1995 | Bell | 364/419.2 |
| 5,696,981 * | 12/1997 | Shovers | 395/760 |
| 5,708,822 | 1/1998 | Wical | 395/751 |
| 5,781,879 * | 7/1998 | Arnold et al. | 704/9 |
| 5,794,050 | 8/1998 | Dahlgren et al. | 395/708 |
| 5,873,056 * | 2/1999 | Liddy et al. | 704/9 |
| 5,918,222 * | 6/1999 | Fukui et al. | 707/1 |
| 6,006,221 * | 12/1999 | Liddy et al. | 707/5 |
| 6,026,388 * | 2/2000 | Liddy et al. | 707/1 |
| 6,061,675 * | 5/2000 | Wical | 706/45 |
| 6,202,058 * | 3/2001 | Rose et al. | 706/45 |

OTHER PUBLICATIONS

Osgood, Charles E.; "On the Whys and Wherefores of E, P, and A," Journal of Personality and Social Psychology, vol. 12, No. 3, pp. 194–199, 1969.

Oskamp, Stuart; "Attitudes and Opinios," Prentice–HAll, Inc. pp. 34–48, 1977.

Ed. by Osgood et al.; "Language, Meaning and Culture," Praeger Publishers; Ch. 7, pp. 203–234; 1990.

\* cited by examiner

*Primary Examiner*—John Breene
*Assistant Examiner*—Susan F. Rayyan
(74) *Attorney, Agent, or Firm*—Steven P. Koda

(57) ABSTRACT

A computerized interactive language reference system includes a database of terms with associated denotative, connotative and human interest information. The system goes through each word of a passage and determines whether there is an entry in the database for such word. For each term where there is an entry, there is a check to see if the term has more than one denotative meaning. Where there is more than one denotative meaning, an appropriate one of the denotative meanings is selected. The system evaluates the passage for positive emotional connotations, negative emotional connotations, global emotional connotations, human interest, connotations of power, connotations of activity and connotations of abstractness/concreteness. Dominant emotional connotations and dominant words also are specifically identified and ranked.

47 Claims, 8 Drawing Sheets

SYSTEM FOR CONNOTATIVE ANALYSIS OF DISCOURSE

CROSS REFERENCE TO RELATED APPLICATION

This invention is related to commonly-assigned U.S. patent application Ser. No. 09/372,377 filed on Aug. 11, 1999 for "Systems For Identifying Connotative Meaning," now pending; commonly-assigned U.S. patent application Ser. No. 09/372,549 filed on Aug. 11, 1999 for "System for Quantifying Intensity of Connotative Meaning," now pending; commonly-assigned U.S. patent application Ser. No. 09/372,243 filed on Aug. 11, 1999 for "Interactive Connotative Dictionary," now pending; and commonly-assigned U.S. patent application Ser. No. 09/372,244 filed on Aug. 11, 1999 for "Interactive Connotative Thesaurus System," now pending. The content of all such applications are incorporated herein by reference and made a part hereof.

BACKGROUND OF THE INVENTION

This invention relates to a computerized interactive system of language analysis, and more particularly to a system for the connotative analysis of discourse.

Language is an abstract, rule-governed system of arbitrary symbols that can be combined in countless ways to communicate information. All languages include a system of phonology (i.e., set of sounds), semantics (i.e., word, phrase and sentence meanings), morphology (i.e., rules for combining smallest meaningful units to form or alter words), syntax (i.e., ways in which words are organized into phrases and sentences) and pragmatics (i.e., rules governing a conversation and social use of language).

The use of language enables humankind to develop advanced cognitive abilities. Cognitive development relates to the changes in a person's memory, thinking, use of language and other mental skills as they develop from infants to adults. Humans develop a certain degree of cognitive competence. In addition to such cognitive competence, humans also display and experience feelings, emotions and moods. In particular, our emotional state or the emotional state we desire to elicit can influence our choice of words. Every human language enables people to communicate both intellectually and emotionally because words and phrases convey both cognitive and affective meaning. 'Affective' means to be influenced by or result from emotions.

Linguistics is the scientific study of language. Semantics is the branch of linguistics that deals with the study of the relationship between words or phrases and their meanings. Of particular significance here are the contrasting linguistic terms, denotation and connotation. 'Denotation' is a particular meaning of a symbol. 'Connotation' is an idea or meaning suggested by or associated with a word or phrase. Thus, 'denote' describes the relation between a word or phrase and the thing it conventionally names, whereas 'connote' describes the relation between the word or phrase and the images or associations it evokes. As used herein a denotation is an objective, cognitive meaning which refers to the direct relationship between a term and the object, idea or action it designates. As used herein, a connotation is a subjective, affective meaning which refers to the emotive and associative aspect of a term.

The denotative meanings of words have been systematically codified into definitions and collected together to form dictionaries, thesauruses and related denotative language references. However, the codification of connotative meanings has not been achieved. Consider, for example, a dictionary which provides the following denotative meaning for the word 'pub': "a building providing alcoholic drinks for consumption on the premises" (Oxford Dictionary). However, the word 'pub' simultaneously conveys a host of emotional connotations, such as merriment, pleasure, cheerfulness, perhaps some sadness, and so on. Similarly, words such as 'summer', 'love', and 'melody' have a variety of positive emotional connotative associations for most people, while words such as 'cancer', 'rape', and 'homeless' have negative emotional connotations for most people. In all cases, the associated connotations are not systematically accessible using any known language reference resource or tool.

The reason for the absence of codification of connotative meaning is that, while words readily evoke emotional connotations, the converse is not true: emotional connotations are not easily codified using words. Unlike denotative meaning, affective meaning does not naturally lend itself to systematic word-symbol description. Emotions are felt, not thought, so the relationship between a word and its associated connotative content, while real, is not codifiable using the relatively straightforward methods employed by lexicographers in fashioning denotative definitions. Accordingly, there is a need for a connotation language reference tool and a system for codifying the connotative content of such a tool.

Not only is it desirable to identify connotative meaning, it also is desirable to quantify the intensity associated with a connotation. Some words or phrases evoke stronger responses than others. Some words or phrases are more activity oriented. In the 1950s, Charles Osgood, an American psychologist developed a method of constructing bipolar scales based on semantic opposites, such as "good-bad", "soft-hard", "fast-slow," "clean-dirty," "valuable-worthless," "fair-unfair," and so on. Osgood called these scales "semantic differential" scales because they differentiated attitudinal intensity based on a person's subjective understanding of the connotative meanings of words. Osgood et al. explored large amounts of data provided by students who evaluated numerous words and phrases on numerous semantic differential scales. The outcome of Osgood's investigations was a description of the existence of "Semantic space," three measurable underlying attitudinal dimensions that proved in subsequent research to be robustly identifiable across other languages and cultures. Osgood named these dimensions Evaluation, Power, and Activity (EPA). Experimentation by many investigators around the world confirmed the reality of semantic space and its cross-cultural validity (Japan, Scandinavia, Germany, Ireland etc.).

The semantic differential is a method for measuring the meaning of an object to an individual. It may also be thought of as a series of attitude scales. A subject is asked to rate a given concept (for example, 'Irish', 'Republican', 'wife', 'me as I am') on a series of seven-point bipolar rating scales. Any concept—whether it is a political issue, a person, an institution, a work of art—can be rated. Subgroups of the scales can be summed up to yield scores that are interpreted as indicating the individual's position on three underlying dimensions of attitude toward the object being rated. These dimensions have been identified by using factor-analytic procedures in examining the responses of many individuals concerning many concepts or objects. It has been found that three subgroups measure the following three dimensions of attitude: (1) the individual's evaluation of the object or concept being rated, corresponding to the favorableunfavorable dimension in more traditional attitude scales; (2) the individual's perception of the potency or power of the object or concept; and (3) the individual's perception of the activity of the object or concept. (See Kidder, L. H., "Research Methods in Social Relations;" 1981).

The problem with the semantic differential technique is that it does not distinguish beyond a single evaluative continuum, with positive attitude at one end of the scale through negative attitude at the other end. That is, it does not actually identify any individual emotions. Moreover, although several short "semantic differential dictionaries" have been developed (known in the literature as semantic "atlases" because they are analogous to "maps" of semantic space), consisting of 500 to 1,500 words with EPA scores for each word, the technique of semantic differential is not associated with any system or method for codifying the words of any given language, even on a single affective variable. According there is a need for a system for codifying the connotative meaning of words.

Computerized systems for analyzing language include various language parsing systems and grammar checkers. Such systems relate more to the mechanical analysis of discourse rather than to the content and quality of discourse.

In general written discourse varies widely in emotional and imaginative content, where works more imaginative tend to rely more on connotative content to impact the intended audience of the discourse. Pure non-fiction, which is primarily informational in content is at one end of a continuum ranging from non-imaginative to imaginative discourse. Such pure non-fiction works are mainly comprised of words having comparatively little emotionally-associated connotative content. These documents tend to be objective, impersonal, and occupation-specific, such as academic and scientific research papers; business textbooks; administrative documents; and technical manuals.

At the other end of the continuum is literary art. Such works contain many words and idioms that are charged with emotional and human-interest connotations. These works tend to be subjective, personal, leisure-oriented, and appealing to the imagination. They include novels, short stories, plays, movie and TV scripts, poetry, and song lyrics.

In the middle are many varieties of non-fiction that employ imaginative elements. Their authors try to present information while using vocabulary with sufficient connotative content to hold the interest and attention of readers. This type of writing includes: magazine and newspaper journalism; public relations and advertising messages; travel writing; self-help; scripted speeches; and religious writing such as sermons.

Although there are many fields of writing where connotative content is important to the quality of the work, there have not been tools for evaluating the connotative content of discourse. In particular, there has not been any system which analyzes the emotional meaning and impact of written discourse. Accordingly, there is a need for a system for connotative analysis of discourse.

SUMMARY OF THE INVENTION

According to the invention, a computerized interactive language reference system is provided for analyzing connotative content of discourse. The system is based upon a database of terms (i.e., words and phrases) and their associated denotative and connotative meanings.

According to one aspect of the invention, a data base is generated which stores the denotative context and connotative meanings of a plurality of words and phrases. Connotative meaning, along with the intensity of such meaning, are identified using a statistical model of sampled responses from select panels of evaluators.

According to another aspect of the invention, areas of human interest also are associated with a given term and its denotative meaning. Further, scaled ratings of the power, activity and abstract/concrete qualities of the term are maintained.

According to another aspect of the invention, connotative meanings for any given term are identified from a range of emotional descriptor terms. There are a plurality of predefined categories of emotional descriptors. In one embodiment described below for the English language there are 8 categories. In the preferred embodiment there are four categories of positive emotions (e.g., affection/friendliness, enjoyment/elation, amusement/excitement and contentment/gratitude) and four categories of negative emotions (e.g., sadness/grief, anger/loathing, fear/uneasiness, and humiliation/shame). Within each category there are a predefined list of emotional descriptors. A term may have a connotative meaning in any or all of the emotional categories. Some terms may not have any connotative meaning. In some embodiments only one emotional descriptor is permitted to be assigned for a given emotional category for a given term. Thus, for an eight category embodiment, any term can have 0 to 8 emotional descriptors—the emotional descriptors being from different emotional categories. In other embodiments a primary and a secondary emotional descriptor may be assigned for any given term. For such an embodiment, which is based on 8 emotional categories, any term can have 0–16 emotional descriptors—the emotional descriptors being in pairs, where the two emotional descriptors in a given pair being for a given emotional category. Different pairs include emotional descriptors for different emotional categories.

According to another aspect of the invention, for each emotional descriptor associated with a given term, there is an intensity rating of how strongly or intensely the term tends to promote or relate to the emotional descriptor.

According to another aspect of the invention, all or a portion of a work of written discourse is analyzed for connotative content. Such portion of work is stored in computer-readable format and input to the system. In one example, a user selects a passage to analyze. The system goes through each word of the passage and determines whether there is an entry in the database for such word. The system also identifies phrases with entries in the data base. For each term (i.e., word or phrase) where there is an entry in the database, there is a check to see if the term has more than one denotative meaning.

According to another aspect of the invention where there is more than one denotative meaning, one of the denotative meanings is selected. Such selection is either done manually by prompting the user to select which denotative meaning is intended, or is done automatically by analyzing the context of the words to select the one denotative meaning which is most likely related to the contextual use of the term in the passage.

According to another aspect of the invention, data in the database for the terms in the selected passage are analyzed. The passage is evaluated at different levels of detail for connotative content. At one level of analysis, the passage is evaluated for positive emotional connotations, negative emotional connotations, global emotional connotations, human interest data, connotations of power, connotations of activity and connotations of abstractness or concreteness.

According to another aspect of the invention, the connotations for each term are tallied to accumulate ratings of emotional and non-emotional connotations.

According to another aspect of the invention, a measure of human interest is determined by calculating the proportion of pronouns, references to gender, characters' names, and other direct references to people relative to the total number of terms or words in the passage selected.

According to another aspect of the invention, a more detailed level of analysis also is performed in which the dominant emotional connotations in the passage are identified and ranked.

According to another aspect of the invention, terms which are dominant in terms of connotative impact are identified. Dominant terms are identified as a function of the number of occurrences of the term/denotative context and the various intensity ratings for each emotional descriptor associated with such term in the context used.

According to one advantage of the invention a large amount of connotative and denotative information is accessible to an end user in a manageable format. According to another advantage of the invention, the data is updated over time for changing connotations. In particular, for a distributed computing model of implementation, such as a global computer network, the content may be updated continually or at varying intervals.

According to another advantage of the invention, an author, editor or another is able to automatically analyze the discourse to view the connotative aspects of the work. Such author editor or another interested party then can go back and alter the choice of some words, phrases, or even passages to fit more closely to a connotative profile desired for the discourse. In particular, by iteratively editing and analyzing the discourse a more desirable and effective discourse can be obtained for a given target audience. These and other aspects and advantages of the invention will be better understood by reference to the following detailed description taken in conjunction with the accompanying drawings.

DESCRIPTION OF SPECIFIC EMBODIMENTS

A system and method are described for identifying, codifying, and storing connotative meaning inherent in the words and phrases of any language, along with a system for connotatively analyzing discourse. Throughout this description, a preferred embodiment and examples given should be considered as exemplars rather than limitations on the method and system of the present invention.

Figure 1:
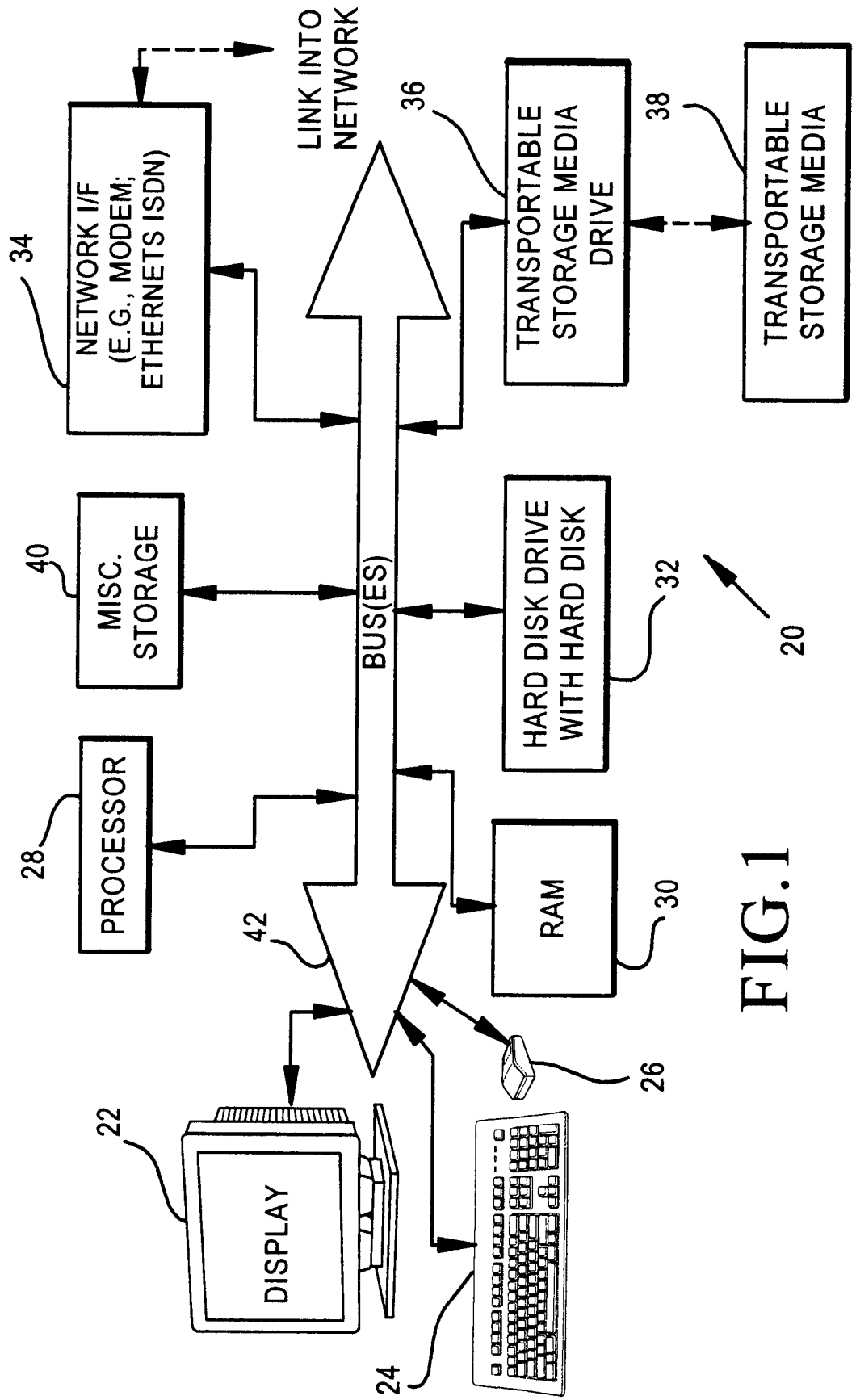
FIG. 1 is a block diagram of a host computer system.

Many of the functions of the present inventions preferably are performed by or with the assistance of a programmed digital computer of the type which is well known in the art, an example of which is shown in FIG. 1. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

System for Analyzing Connotative Discourse

Figure 2:
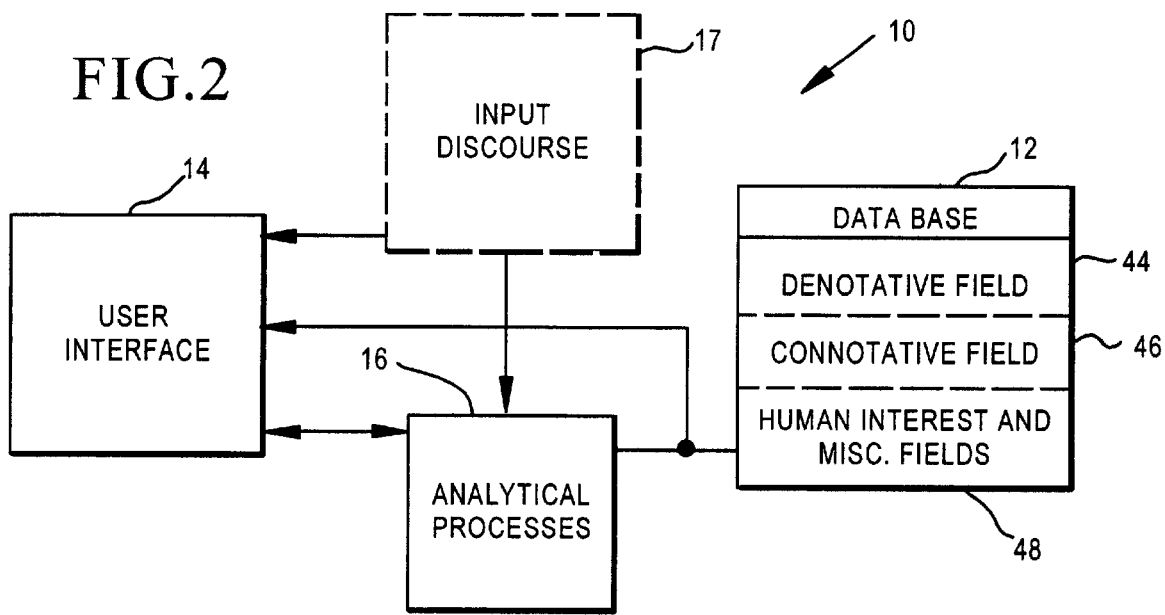
FIG. 2 is a diagram of a system for connotative analysis of discourse according to an embodiment of this invention.

Referring to FIG. 2, a connotative language analysis system 10 is formed by a data base 12, a user interface 14 and various analytical processes 16. The system 10 receives an input discourse 17 to be processed. In some embodiments the input discourse 17 is a file or other digitally encoded version of textual discourse. Preferably the data base 12, interface 14 and processes 16 are implemented in electronic format as one or more software programs executed on a host computer system or over a host computer network. For example, the system 10 may be stored on an optical disc (e.g., CD-ROM) or other storage media and installed onto the host computer system or network. Specifically, the data base 12, user interface software 14 and analytical processes 16 may be loaded and installed locally onto the host computer system or network. In some implementations the software embodying the user interface 14 and processes 16 are installed to be resident on the host computer system or network, while the data base 12 is stored and accessed from a removable storage media, such as an optical disk. In other embodiments the data base 12 is centrally located among one or more network server computers, while the user interface software 14 and processes 16 are stored and executed from either a local end user computer system or remotely at the server computer. The implementations may vary from local copies for a given end user's access to one or more copies stored on a private network or even a global computer network which users log into to access and use the dictionary.

Data Base 12

In a preferred embodiment of the data base 12, the data base 12 includes a set of denotative fields 44, a set of connotative fields 46, and a set of human interest and miscellaneous fields 48. The denotative fields and human interest/miscellaneous fields are not necessary, but provide additional information to the user. In some embodiments the data base 12 includes only the set of connotative fields 46.

The set of denotative fields 44 includes at least two fields, and preferably three fields. In one implementation the denotative data is obtained from one or more electronic or print-based dictionaries in any language. Database records may be created for each word or phrase of the language, which may be the English language or any other language. In some embodiments the connotative language reference system may be specialized for a given subject (e.g., medical/health contexts; science). In other embodiments a general language reference is implemented. Table 1 below lists the two desired fields and one optional field included among the denotative fields:

TABLE 1

Denotative Field Types

1. Term (i.e., Word or phrase/idiom)
2. Specific denotative context
3. Part of speech—(optional)

For each record in the data base 12, one denotative field is assigned to the word or phrase. A second denotative field is assigned to the denotative context (dictionary meaning) of the word or phrase. A third denotative field is assigned to the part of speech. Preferably, each context of each word is assigned a separate database record. Thus, if the dictionary definition of a single word has two meanings among a total of five denotative contexts, then there are five records, one for each context. There may be multiple contexts for a given dictionary meaning when, for example, there are different parts of speech for the word/meaning.

Assigning an additional field to track the meanings that subsume the contexts is not necessary to practice the invention, but such a field may be assigned in an alternative embodiment. The total number of records required is equal to the sum of all of the denotative contexts of all of the words in the dictionary or other denotative data sources.

In a preferred embodiment the set of connotative fields 46 includes a block of one or more fields for each one of a plurality of emotional categories. In a best mode embodiment eight emotional categories have been identified, and thus, eight blocks of connotative fields are included. In other embodiments the number of categories may vary to be more or less than eight. The number of fields comprising each block may vary. In one embodiment the number of fields in a given category corresponds to the maximum number of emotional descriptors for such category that may be associated with a given term and denotative context (i.e., with a database record). Although the method for defining connotative meaning may vary, in one embodiment the data is collected from multiple sources. In a given implementation the sources are judges or panels of judges. In an embodiment where one emotional descriptor is stored per emotional category, the primary emotional descriptor selected by the panel of judges is stored in the data base. In another embodiment there are two fields per emotional category used to store a primary emotional descriptor and a secondary emotional descriptor.

In another embodiment, there is a separate field in each block for each of a prescribed number of sample judges. In an example, where 24 connotative judges are used, each of the eight blocks of fields 46 includes 24 individual fields, one to hold each judge's emotional descriptor data for each word in each context. Several additional fields are reserved to hold calculated data based on connotative judges' emotional descriptor data. Fewer or more judges may be used, adjusting the number of fields within each block accordingly. Where each judges data is stored, an additional field or fields are included per emotional category to identify the primary emotional descriptor, or both the primary and secondary emotional descriptor, selected by the plurality of judges.

Table 2 lists eight emotional categories corresponding to the eight blocks of fields 46 for a best mode embodiment. The general emotional classification "Positive Emotions" subsumes four emotional categories, and the general emotional classification "Negative Emotions" subsumes the other four emotional categories, as practiced in a preferred embodiment of the invention. Each emotional category subsumes a list of 12 to 37 specific emotional descriptors, each of which is associated with a two-digit identifying code number. The specific code number may vary. Further, the manner in identifying the distinct descriptors also may vary. The total number of emotional descriptors in this example is 164. In various embodiments one or more emotional descriptors may be removed from this list, entire emotional categories may be removed from the list, or one or more emotional categories and descriptors may be added to this list.

The connotative descriptors that appear in Table 2 below are English language connotative descriptors for one embodiment of a general connotative language reference system. The specific words that make up the emotional connotative descriptors may vary. Of course such descriptors will vary from language to language.

TABLE 2

Connotative Database Fields

| POSITIVE EMOTIONS: | | | |
| --- | --- | --- | --- |
| Affection/ Friendliness | Amusement / Excitement | Enjoyment/ Elation | Contentment/ Gratitude |
| 01 Adoration | 01 Amazement | 01 Admiration | 01 Appreciation |
| 02 Affection | 02 Amusement | 02 Bliss | 02 Comfort |
| 03 Amorousness | 03 Astonishment | 03 Cheer | 03 Contentment |
| 04 Devotion | 04 Eagerness | 04 Delight | 04 Gladness |
| 05 Fondness | 05 Enthusiasm | 05 Ecstasy | 05 Gratitude |
| 06 Friendliness | 06 Excitement | 06 Elation | 06 Hope |
| 07 Infatuation | 07 Exhilaration | 07 Enjoyment | 07 Peacefulness |
| 08 Kindliness | 08 Exuberance | 08 Euphoria | 08 Relief |
| 09 Liking | 09 Fun | 09 Exultation | 09 Satisfaction |
| 10 Love | 10 Glee | 10 Happiness | 10 Serenity |
| 11 Lust | 11 Hilarity | 11 Joy | 11 Thankfulness |
| 12 Passion | 12 Merriment | 12 Jubilation | 12 Well-being |
| 13 Tenderness | 13 Mirth | 13 Pleasure | |
| 14 Trust | 14 Surprise | 14 Pride | |
| 15 Warmth | 15 Thrill | 15 Rapture | |
| | 16 Wonder | | |
| NEGATIVE EMOTIONS | | | |
| Sadness/Grief | Fear/ Uneasiness | Anger /Loathing | Humiliation /Shame |
| 01 Affliction | 01 Alarm | 01 Abhorrence | 01 Chagrin |
| 02 Agony | 02 Anxiety | 02 Acrimony | 02 Contrition |
| 03 Anguish | 03 Apprehension | 03 Aggravation | 03 Degradation |
| 04 Dejection | 04 Desperation | 04 Anger | 04 Discredit |
| 05 Demoralization | 05 Distress | 05 Animosity | 05 Disgrace |
| 06 Depression | 06 Dread | 06 Annoyance | 06 Dishonor |
| 07 Desolation | 07 Fear | 07 Antagonism | 07 Disrepute |
| 08 Despair | 08 Horror | 08 Antipathy | 08 Disrespect |
| 09 Despondency | 09 Nervousness | 09 Aversion | 09 Embarrassment |
| 10 Disappointment | 10 Panic | 10 Bitterness | 10 Guilt |
| 11 Discouragement | 11 Paranoia | 11 Contempt | 11 Humiliation |
| 12 Disheartenment | 12 Stress | 12 Creepiness | 12 Indignity |
| | 13 Tension | 13 Detestation | |

TABLE 2-continued

Connotative Database Fields

| | | | |
|---|---|---|---|
| 13 Disillusionment | 14 Terror | 14 Dissatis- | 13 Mortifi- |
| 14 Dismay | 15 Uneasiness | faction | cation |
| 15 Distress | 16 Worry | 15 Disdain | 14 Regret |
| 16 Downhearted- | | 16 Disgust | 15 Remorse |
| ness | | 17 Dislike | 16 Shame |
| 17 Forlornness | | 18 Enmity | 17 Stigma |
| 18 Gloom | | 19 Envy | |
| 19 Grief | | 20 Exasper- | |
| 20 Heartache | | ation | |
| 21 Heartbreak | | 21 Frustration | |
| 22 Heartsickness | | 22 Fury | |
| 23 Hopelessness | | 23 Hatred | |
| 24 Hurt | | 24 Hostility | |
| 25 Longing | | 25 Irritation | |
| 26 Melancholy | | 26 Indignation | |
| 27 Misery | | 27 Ire | |
| 28 Pain | | 28 Jealousy | |
| 29 Pity | | 29 Loathing | |
| 30 Sadness | | 30 Offense | |
| 31 Sorrow | | 31 Outrage | |
| 32 Suffering | | 32 Rage | |
| 33 Torment | | 33 Rancor | |
| 34 Unhappiness | | 34 Resentment | |
| 35 Wretchedness | | 35 Vexation | |
| 36 Yearning | | 36 Virulence | |
| | | 37 Wrath | |

In an embodiment including a set of human interest fields 48, the fields 48 relate a record and its denotative context to a human interest category. The purpose of incorporating the human interest fields is to permit the end user to easily retrieve special connotative content from the database by first selecting one or more human interest filters before querying the database. The human interest fields employed in a preferred embodiment of the invention are listed in Table 3. There are nine groupings of the human interest categories in such embodiment. Each human interest category is a field having a descriptor word. The categories and descriptors may vary from embodiment to embodiment.

TABLE 3

SET 3: Human Interest Database Fields

| Non-emotional Connotations | Spiritual Identity |
|---|---|
| Power | Biblical Diction |
| Activity | Christianity |
| | Judaism |
| Rhythm | Islam |
| Number of Syllables | Hinduism |
| Accented Syllable | Buddhism |
| | Other Religious |
| Special Diction | Myth and Legend |
| Question-starting Words | Paranormal |
| Core Words Identified by S. I. | |
| Hayakawa | Physical Identity |
| | Physical Appearance |
| Personal Identity | Body |
| Gender | Health |
| First Names (Baby Names) | |
| Notorious Or Celebrated People | Perception |
| Languages | Abstract/Concrete Continuum |
| National Identity | Place, General |
| Organizations of Note | Place, Event |
| Home | Place, Transportation |

TABLE 3-continued

| Personal Relationships | Place, Cosmos |
|---|---|
| Intimacy | Place, Noted |

SET 3: Human Interest Fields

| Perception (cont'd) | Non-human Life |
|---|---|
| Color | Animals |
| Hearing | Plants |
| Touch | Micro Organisms |
| Taste | |
| Smell | Argot/Vernacular |
| Time, General | Slang |
| Time, Historical | Taboo |
| Time, Calendar | Offensive |
| Non-medical Drug Use | Derogatory |
| | Disgusting/Revolting |
| | Euphemistic |
| | Cliche |

In a preferred embodiment there are also a set of miscellaneous fields 48 for storing respective ratings of power, activity and abstractness versus concreteness. In a preferred embodiment of the invention, the assignment of the fields and records as described above effectively links each traditional dictionary definition of each word in each context with more than 200 connotative, human interest and miscellaneous variables. The data base is organized into one or more tables, files or other units of organizing data. Regardless of the number of tables or files, there are entries from each table or file which correspond to a term (i.e., a word or phrase among the denotative fields). The data associated with any given term is referred to herein and in the claims as a 'record', whether or not coming from a single table or file, or from multiple tables or files. Each record includes a field which identifies a term and another field which identifies the denotative context for the term. The record also includes a field which identifies a connotative meaning. Thus, each record includes at least three fields allocated among 1 to 3 tables, files or other units of organization of the data base. In a preferred embodiment there are a plurality of connotative meaning fields, at least one for each of a plurality of emotional categories. The connotative meaning fields identify an emotional descriptor for a corresponding emotional category. Such identification may be an identification of a specific emotional descriptor within the corresponding category or an indication that there is no emotional descriptor for such category. An indication of no connotative meaning is still considered to be connotative meaning information.

In varying embodiments additional fields are included for any one or more of the following types of information: parts of speech, intensity of connotative meaning, power rating, activity rating, abstract/concrete rating, human interest areas. When an intensity field is included the intensity is an intensity of a connotative meaning and is associated with a corresponding emotional category and the identified emotional descriptor for such category.

User Interface 14 and Analyzing Processes 16

In a preferred embodiment a graphical user interface 14 is implemented, which provides an end user with the capability of analyzing a passage of discourse for connotative content. Although there are many ways in which a user interface may be implemented, in one embodiment a system with menus and windows is used.

Figure 4:
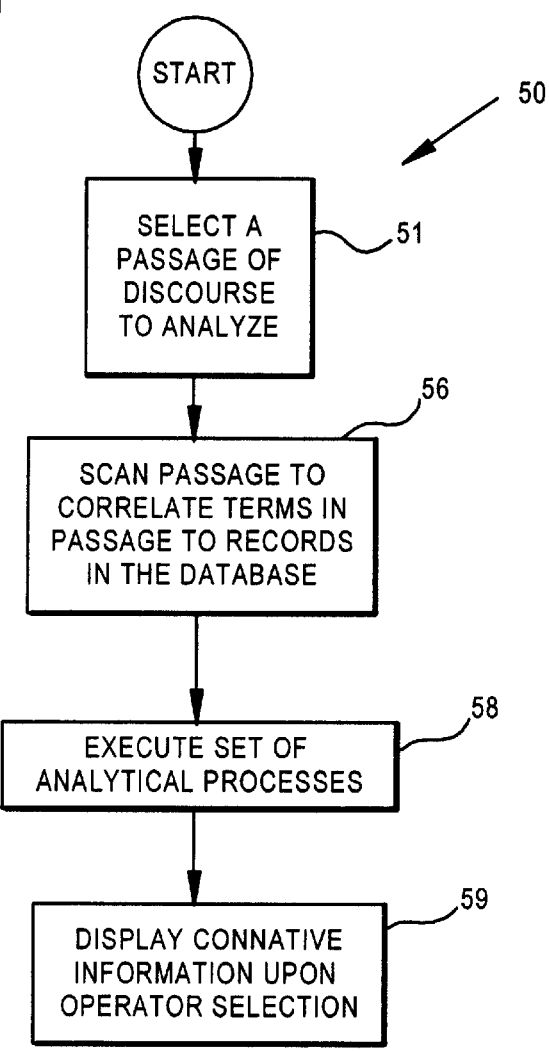
FIG. 4 is a flow chart of a method for analyzing discourse according to an embodiment of this invention.
Figure 3:
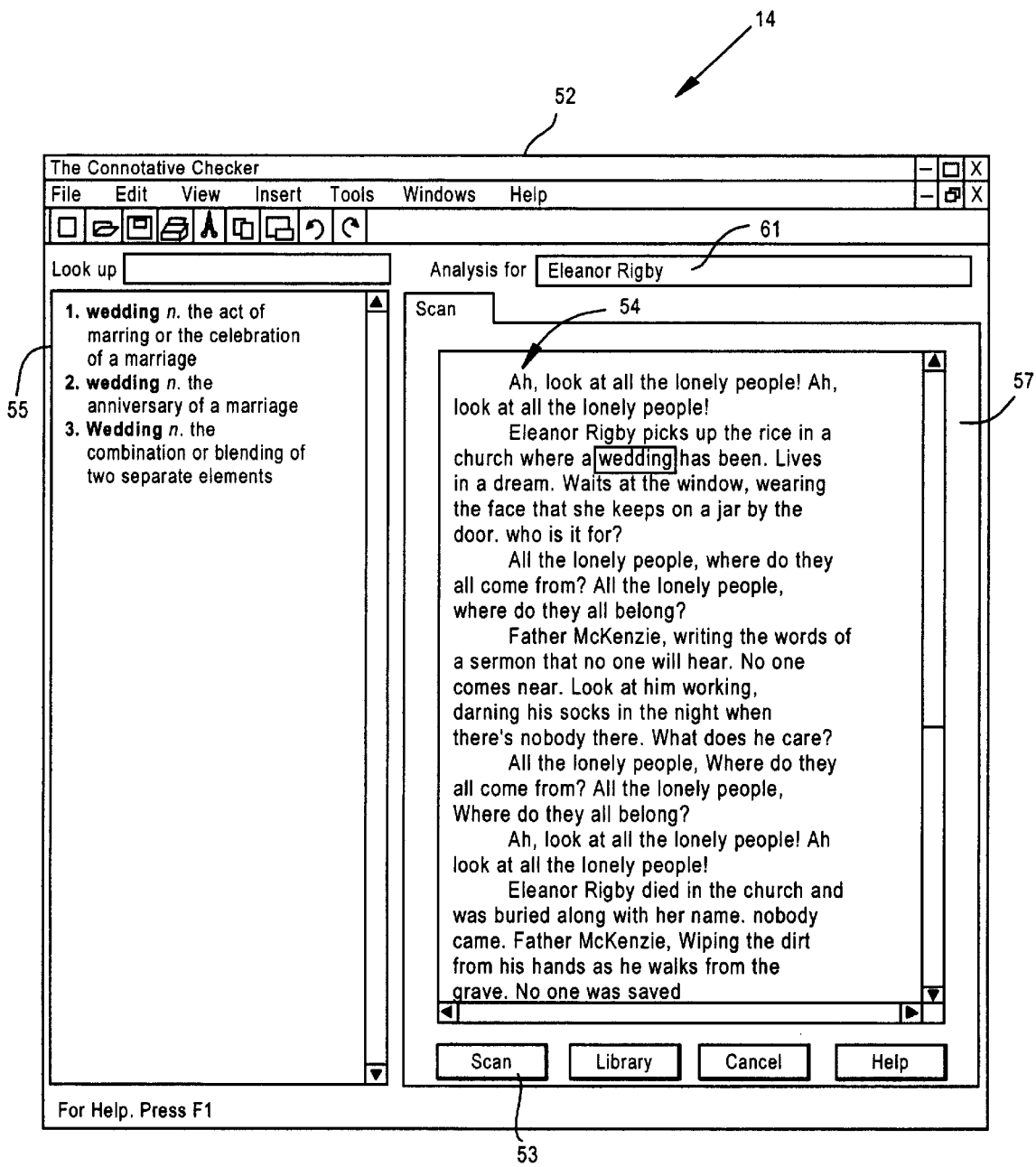
FIG. 3 is a display sample of a user interface according to an embodiment of this invention.

Referring to FIG. 3, in one embodiment the user interface 14 includes a window 52 having an area 55 for displaying denotative information from the database 12 and an area 57 with varying content. Referring to FIG. 4, a process 50 for analyzing a passage for connotative content is shown. At step 51, input discourse 17 (see FIG. 2) is loaded and a passage 54 (see FIG. 3) of discourse is selected. At step 56, an operator presses a button 53 to commencing scanning the passage 54. During the scanning, the passage 54 is evaluated to identify words and phrases in the passage that correspond to terms in the data base 12. As previously described, there is a separate record in the data base for each denotative context of each term. Thus, for some terms there may be multiple records in the data base 12. In one embodiment, one of the multiple records is automatically selected and associated with the term of the passage. Such selection is based on probabilities or a language distinctive context interpretation system. For example U.S. Pat. No. 5,794,050 to Dahlgren et al. discloses a system for interpreting natural language input. In other embodiments or at the user's option, the user is prompted to select the appropriate denotative context (and thus the appropriate record). Such user selection has the advantage of being more accurate, but the disadvantage of being slower. Referring to FIG. 3 the user is being prompted to select an appropriate denotative context for the term "wedding." As shown in area 55 there are three denotative contexts for "wedding." From viewing the passage 54, the user can determine that the first context is correct. In one embodiment the user simply clicks on the first definition to make their selection. The scanning process then continues. In some embodiments two passes are performed. During a first pass, all words and phrases in the passage that have only one denotative context are identified separate from those that have multiple denotative contexts. During a second pass, the system prompts the user to select the appropriate denotative context for each term having multiple denotative contexts in the database 12.

Figure 5:
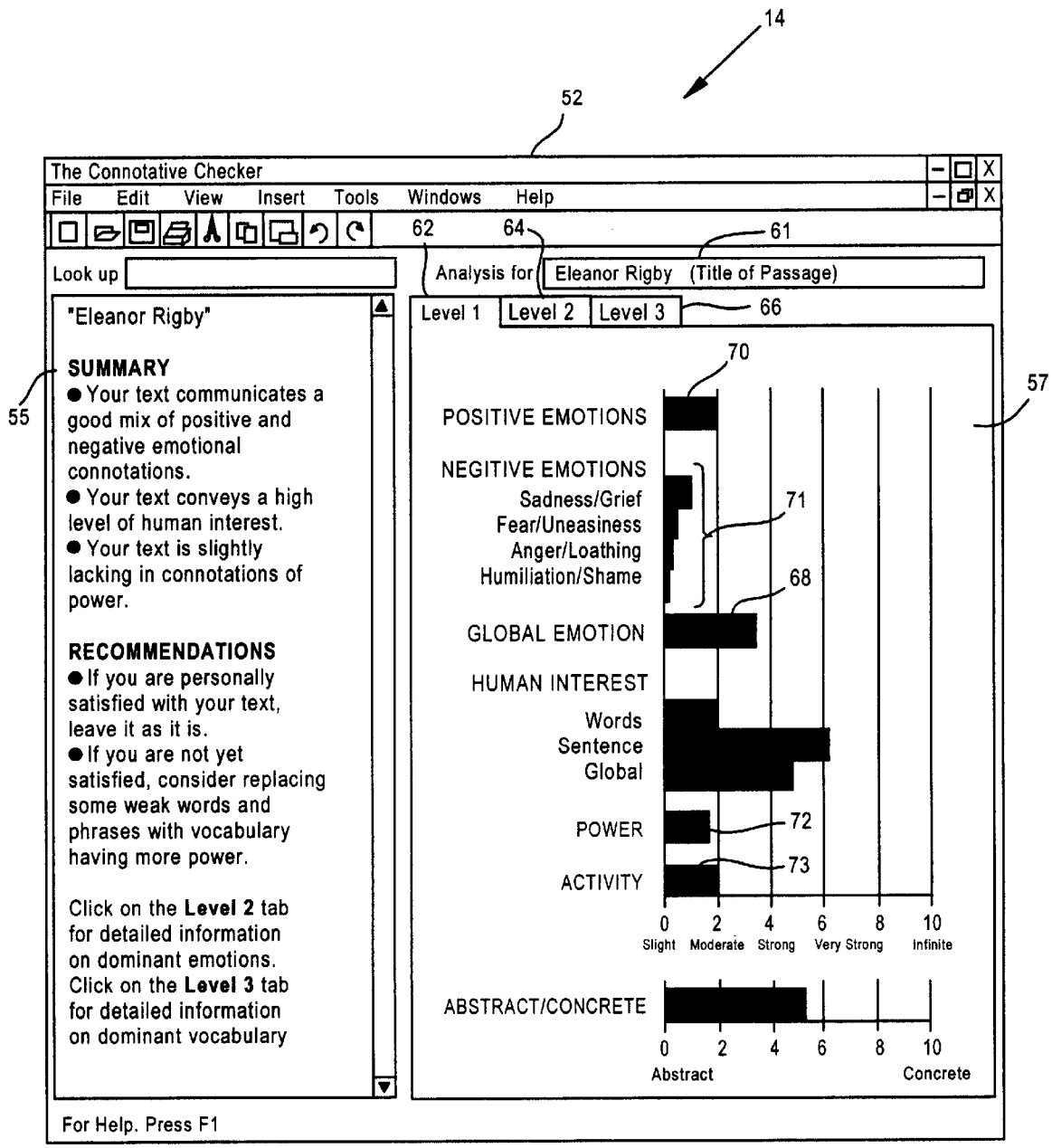
FIG. 5 is a display sample of the user interface for a level 1 analysis of discourse.

Referring again to FIG. 4, at step 58 a set of analytical processes are executed to derive connotative information pertaining to the passage. The derived connotative information then is displayed at step 59 in area 57 of the display window 52 (see FIGS. 5–8). Referring to FIG. 5, there are three tabs 62, 64, 66 corresponding to three levels of information. FIG. 5 shows the information at a first level where tab 62 is selected. Display box 61 shows the title of file name of the input discourse 17 or passage 54.

The high level information of FIG. 5 includes a rating of the passage for emotional content in terms of positive emotion, negative emotion and global emotion (i.e., positive not distinct from negative emotion). The high level information also includes a rating of the passage for human interest by words, sentences and global content. a rating of the passage for power, a rating of the passage for activity and a rating of the passage along a scale of abstractness versus concreteness.

Emotional content of the passage is derived by counting the number of emotional connotations associated with all the terms in the passage. Each term in the passage corresponds to 0 or one record in the database. Each record in the database 12 has at least one connotative field for each one of a plurality of emotional categories. For an embodiment where only one emotional descriptor is associated with a record per emotional category, there can be 0 to n emotional connotations per record (or per term in the passage), where n corresponds to the number of emotional categories. In some embodiments there are two connotative fields per emotional category. In such embodiment there can be 0 to 2n emotional connotations per record or per term in the passage.

A rating of global emotion is a cumulative count of the total number of emotional connotations for all terms of the passage. Referring to FIG. 5 a bar graph 68 is displayed indicating the global emotion rating of the passage. Such rating is based on a scale. The scale is shown to vary from slight to infinite, although the scale referencing may vary.

The emotional connotations stored for each term in the database are associated with either a positive emotional category or a negative emotional category. Thus, the global count can be divided to rate the passage for positive emotions and for negative emotions. Referring again to FIG. 5 a bar graph 70 is displayed indicating the positive emotion rating of the passage. Further, the global count can be broken down more finely by emotional category. FIG. 5 shows the negative emotions separated into the categories of negative emotions with a bar graph 71 displayed for each category.

In a preferred embodiment, a category by category analysis is performed to obtain the ratings for positive and negative emotions. For a given category, the level 1 rating for connotative content is derived from the following equation:

$$E_{ip} = \frac{\sum_{j=1}^{n} D_{i,j}}{n}$$

where
$E_{ip}$=Rating of connotative content of a passage, p, for emotional category i;

$n_p$=total number of words having connotative content in passage p (i.e., excludes articles, conjunctions, forms of the verb "to be", et cet.); and $D_{i,j,p}$=intensity of word j in passage p for primary emotional descriptor in emotional category i.

The total rating for all positive emotions is the average rating for the four positive emotional categories. Similarly the total rating for all negative emotions is the average rating for the four negative emotional categories. The total rating for global emotion is the average rating for the four positive emotional categories plus the average rating for the four negative emotional categories. The ratings can be presented in summary fashion (e.g., as for the FIG. 5 examples of global emotion and positive emotion) or by category (e.g., as for the FIG. 5 examples of negative emotion). In some embodiments a different rating scale is used for the judge's selections (e.g., 0 to 7) than for the displayed intensities (e.g., 0 to 10). The ratings in FIG. 5 are shown to be the same 0–10 rating as for the displayed intensities. Thus, to achieve a rating along such scale, the rating is converted to a 0 to 10 scale before being displayed.

With regard to the human interest rating, the passage is analyzed in multiple ways. One way is to count the number of terms which identify people (i.e., terms which are names of people, personal pronouns, references by gender (man, woman, grandma), and non-gender references to people (clown, firefighter). FIG. 5 shows a rating for human interest by words. Such rating is derived from the proportion of words which relate to people to the total number of words in the passage, placed on a scale of 0 to 10.

Another human interest rating is by sentence. Each sentence which includes quoted dialogue, a question, an exclamation, or a command, each incomplete sentence, and each sentence addressed directly to the audience (e.g., reader) are considered to be conversational in nature. The proportion of such conversational sentences to the total number of sentences in the passage is displayed along a scale of 0 to 10, or another scale. Such rating is used as the human interest rating by sentence.

Still another method for rating human interest is a global rating. The global human interest rating is derived from the human interest rating for words and the human interest rating for sentences. The rating for words is weighted more heavily than the rating for sentences. The specific weighting factor may vary. In one embodiment the rating for words, on a scale of 0 to 10, is multiplied by 3.75, while the rating for sentences on a scale of 0 to 10, is multiplied by 0.3. The two weighted ratings then are summed and divided by 2 to get a weighted average. Such weighted average is displayed. In FIG. 5 the global human interest rating is displayed along a scale of 0 to 10, although the scale may vary.

With regard to 'power', the passage is analyzed by deriving the average power rating for all the terms in the passage. In one embodiment only those terms having a power rating are included in the derivation of the average. In another embodiment, a word without an entry in the database is considered to have a power rating of 0. For terms of the passage which correspond to a record in the database, the power rating is read from the corresponding field of the record. The average power rating stored in one embodiment is along a scale of 0 to 7, where each term in the data base 12 has a field for storing the power rating of such term along the same scale. Note however that different scales may be used for displaying data than for rating the data by evaluators. For example, it may be more meaningful for an evaluator to use a scale of 0–5 to rate power. However, it may be more beneficial to display the same rating on a scale of 0–10, for either consistency among sales or for easier acceptance to a user. Thus, the derived power rating can be rescaled to comply with a display scale which differs from the data base scale for power. A similar method is used to derive an average 'activity' rating for the passage and a rating of 'abstractness versus concreteness' for the passage. In particular each record in the database may include a field which stores an activity rating for the term associated with such record. An activity rating is the degree to which the term is an action of relates to an action or activity. Each record in the database also may store a field which associates a term with a relative degree of abstractness or concreteness, where abstract is at an opposite end of a scale from concrete. FIG. 5 shows an example of a power rating, activity rating and abstract/concrete rating for the passage 54 using bar graphs 72, 73, 74. Of course other visual indicators may be used to convey the respective ratings.

Figure 6:
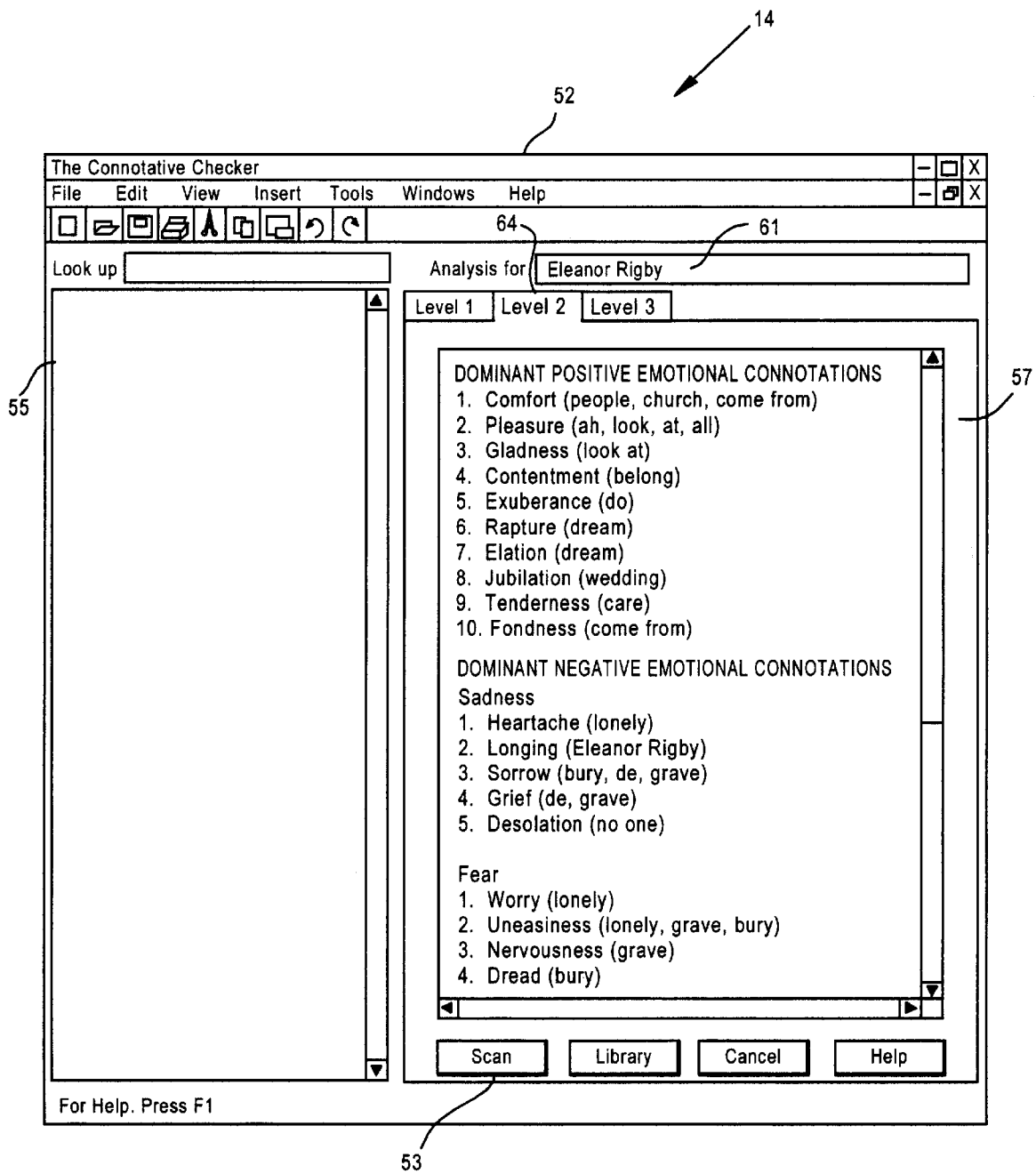
FIG. 6 is a display sample of the user interface for a level 2 analysis of discourse.

Referring to FIG. 6, a more detailed level 2 analysis of the connotative content of the passage 54 is provided by clicking on the level 2 tab 64. The level 2 information includes a listing of the most frequent (i.e., dominant) emotional connotations. In various embodiments such listing can be according to a global ranking for all emotional descriptors. Alternatively, the listing can be according to a ranking by positive emotions in one list and negative emotion in another list. The listing can be more precisely defined into a list for each emotional category. FIG. 6 shows one rank-ordered list of the most frequent positive emotional descriptors associated with the terms of the passage. FIG. 6 shows a set of rank-ordered lists of the most frequent emotional descriptors according to negative emotional categories. Lists for 2 negative emotional categories are shown, although lists for the other two negative emotional categories could be viewed by scrolling down in the window area 57.

The terms of the passage associated with the rank-ordered emotional descriptors are shown in parentheses adjacent to the emotional descriptor in the example illustrated. The number of descriptors listed, the inclusion of passage terms and the method of ordering the descriptors may vary.

Figure 7:
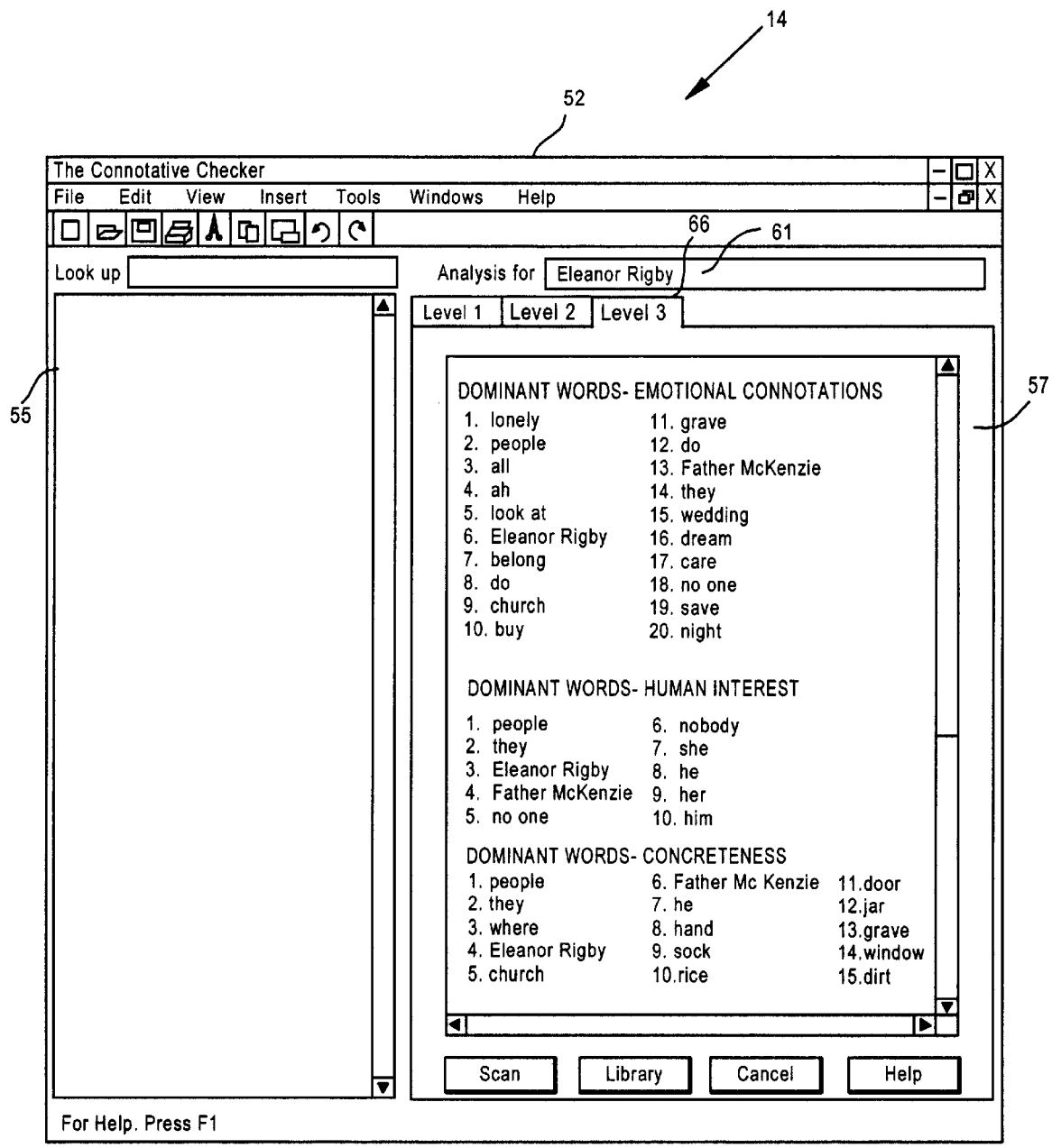
FIG. 7 is a display sample of the user interface for a level 3 analysis of discourse.
Figure 8:
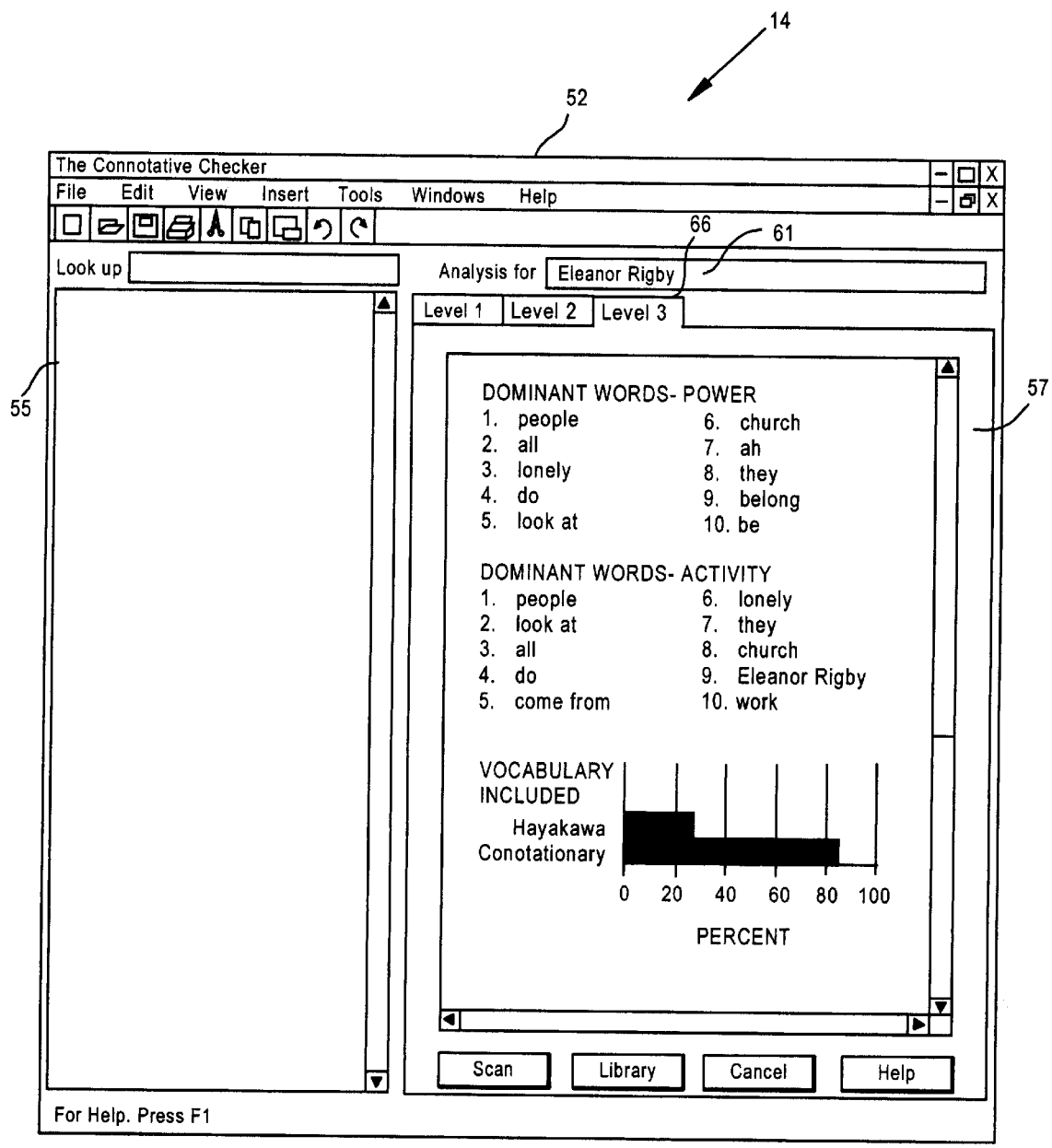
FIG. 8 is another display sample of the user interface for the level 3 analysis of discourse.

Referring to FIGS. 7 and 8, an even more detailed level 3 analysis of the connotative content of the passage 54 is provided by clicking on the level 3 tab 66. The level 3 analysis identifies the dominant words in the passage 54 for emotional connotation, human interest, concreteness or abstractness, power and activity. To derive a dominant word, each word achieves a score based on the number of occurrences of the word (in the given context—so that it identifies a unique record in the database) times the intensity rating for such word. With regard to dominant words for emotional connotation, it is the average intensity among all emotional connotations for such word that is used. For example, consider a first word with intensity ratings of 1, 2, 3, 4, 3, 2, 1, 0 for the eight emotional categories. If such word occurs 10 times in the passage, then it receives a score of 20. The average intensity is 16/8 =2. The score then is 2*10 =20. Consider a second word that has intensity ratings of 3, 4, 3, 4, 3, 4, 3, 4 for the eight emotional categories. The average intensity rating is 3.5. If such word occurs 5 times in the passage, then it receives a score of 17.5. Thus, the first word is more dominant in emotional connotation than the second word, even though the average intensity associated with the first word is less. The number of occurrences causes the first word to be more dominant in this example. Consider a third word that has intensity ratings of 9, 9, 9, 9, 9, 9, 9, 9 for the eight emotional categories. The average intensity rating is 9. If such word occurs 3 times in the passage, then it receives a score of 27. Thus, the third word is more dominant in emotional connotation than the first word or the second word, even though the number of occurrences is less than for either the first word or the second word. The average intensity rating causes the third word to be more dominant in this example.

A similar approach is implemented to rank the words for dominance in the passage based on power, activity and concreteness. For these ranking however there is only one rating stored for each word for the specific ranking. Thus we do not need to calculate an average. The most dominant word is the word with the highest score, where the score is based on the number of occurrence times the ranking. Thus, for a power ranking, the score is the number of occurrences of a word in the passage times the power rating for such word.

To rank the dominant words in the area of human interest, all the words that identify people are ranked by number of occurrences. Such words include names of people, personal pronouns, references by gender (man, woman, grandma), and nongender references to people (clown, firefighter).

In addition a rating of the percent of words in the passage that have connotative meaning is derived. There may be some words in the passage which do not have any connotative meaning and others that do have connotative meaning. The percentage of words that do have connotative meaning is a useful indicator for a writer to determine how dramatic or interesting a work is as distinct from being dull or mildly interesting.

Another rating shown in FIG. 8 is a rating of the percent of words in the passage that are Hayakawa words. Hayakawa words are a set of core words for any given language, as determined by the Hayakawa method known by those of ordinary skill in the art of linguistics. The percentage of words that are Hayakawa words relative to the total number of words in the passage is the displayed Hayakawa rating.

Referring again to FIG. 5, summary and recommendation messages are displayed in area 55 of window 52. Such messages are part of a support database of writing prescriptions and summary information messages. The different prescriptions and messages are displayed when a corresponding trigger occurs. Such corresponding triggers are numerical data from the connotative database. Various ratings of positive and negative emotions result in corresponding messages. In FIG. 5, the mix of positive and negative emotions results in a message "Your text communicates a good mix of positive and negative emotional connotations." Another message would say a substantial mix rather than good mix for a higher rating of positive and negative emotional categories. For a lower rating the message may say a poor mix or even indicate that the writing does lacks connotative value. Similarly messages are present relating to human interest rankings, power ranking, and abstractness or concreteness. For example, messages are included which recite that the writing is abstract, or is somewhat abstract, that the writing conveys a high level of human interest or is devoid of human interest.

Recommendation messages also are displayed in area 55. Such messages are triggered by similar profiles of various emotional, human interest, power and abstract ratings. Exemplary recommendations included in the support data base in one embodiment, include:

All sentences are declarative. for more human interest consider recasting some of your material in the form of questions, commands or dialogue.

Consider using more examples or illustrations incorporating concrete nouns. This will reduce abstractness and increase connotative values.

Do not distribute this text.

Rewrite this text from scratch.

In addition, other messages are included. The tone and content of the messages may vary for differing embodiments.

In a best mode embodiment the data base is stored on a computer readable storage media, such as embedded memory, RAM, ROM, a hard disk, an optical disk, a floppy disk, magneto-optical disk, electro-optical disk, or another known or to be implemented transportable or non-transportable computer readable storage media. The user interface, processing filters and other executable instruction code for maintaining and accessing the data base also is stored on the same or another computer readable storage media of the types listed above.

Under various computing models, the connotative language analysis system 10 is installed at an end user computer or accessed remotely from an end user computer. For resident computing models, the executable instructions may be loaded onto the computer and the data base accessed from a transportable storage media. Alternatively the data base also may be installed locally. One skilled in the art will appreciate the many computing configurations that may be implemented. For non-resident computing models, the data base may be stored at a server computer on a public or private, local or wide area network, or even on a global computer network. The executable instructions may be run either at the end user computer or at a server computer with the data being displayed at the end user's display device.

Identifying Connotative Meaning

According to a preferred embodiment of the invention the connotative meanings associated with the terms found in the connotative language reference system 10 are derived by subjective responses from a plurality of evaluators. In a best mode embodiment the evaluators are a panel of persons having objective credentials or accepted expertise in connotative analysis. However, in some embodiments the evaluators may be selected at random. Such persons are referred to herein as connotative judges. In a preferred embodiment, the Internet is used as a recruitment medium to recruit 100 to 200 individuals who are not known to each other to act as independent connotative judges. In one embodiment, the connotative judges are screened for the following characteristics listed below in Table 4:

TABLE 4

Characteristics and Qualifications of Connotative Judges 1. 25% of all judges aged 40 or older and female
2. 25% of all judges under the age of 40 and female
3. 25% of all judges aged 40 or older and male
4. 25% of all judges under the age of 40 and male
5. All judges having at least 2 years of post-secondary education
6. All judges having an above-average vocabulary and command of whichever language is being used to practice the invention.
7. All judges having a substantial interest and some experience in the craft of writing, preferably creative writing.
8. Judges geographically dispersed over the area of interest for the language of interest.

While the above qualifications are used in one embodiment, the invention may be practiced using any number of judges having any qualifications of one's choosing. For example, connotative judges may be only women, or only men, or only individuals of a defined age or ethnic group, or only people who reside in a certain geographical location. The nature and quality of data captured will of course vary with the demographic profile of connotative judges, as well as with the number of judges used when practicing the invention, their geographical locations, and the linguistic qualifications of the judges.

The connotative judges evaluate the meaning of given words and phrases for connotative content using a questionnaire. The questionnaires preferably are distributed as database software files, although they may also be distributed in paper document form. The responses of the connotative judges are processed using either custom-designed database software or database software commercially available from manufacturers such as Inprise, Oracle, and Microsoft. As the data are analyzed, a database of connotative meaning is constructed, which is linked with each context of each word in the connotative language reference system. Each questionnaire is, in effect, a small database table containing four data fields, preferably five data fields, as summarized in Table 5.

TABLE 5

Data Fields for Questionnaire Tables to Capture Connotative Data

| | |
|---|---|
| Field 1 | A field containing a term selected at random from the term field of the main database |
| Field 2 | A field containing the denotative context for the term in Field 1 |
| Field 3 | A field containing the part of speech for the term in Field 1 (optional, but preferred) |
| Field 4 | A blank field assigned for the connotative judge to record data identifying emotional connotations associated with the term and context in Fields 1 and 2 |

TABLE 5-continued

Data Fields for Questionnaire Tables to Capture Connotative Data
Field 5  A blank field assigned for the connotative judge to record data corresponding to intensity of emotion associated with the term, context and part of speech in Fields 1, 2 and 3

Field 4 is used for identifying connotational meaning. Field 5 is used for identifying the intensity of the connotation. The use of Field 5 is described below in the section, Quantifying Intensity of Connotative Meanings.

In one embodiment, a distributed computing model is employed, in which the connotative judges use their own computers in their own homes or offices to receive questionnaire tables over the Internet (via e-mail or from a World Wide Web site) that are extracted from the main database 12. The connotative judges complete their work on the questionnaire tables, and then return the data tables over the Internet.

Figure 9:
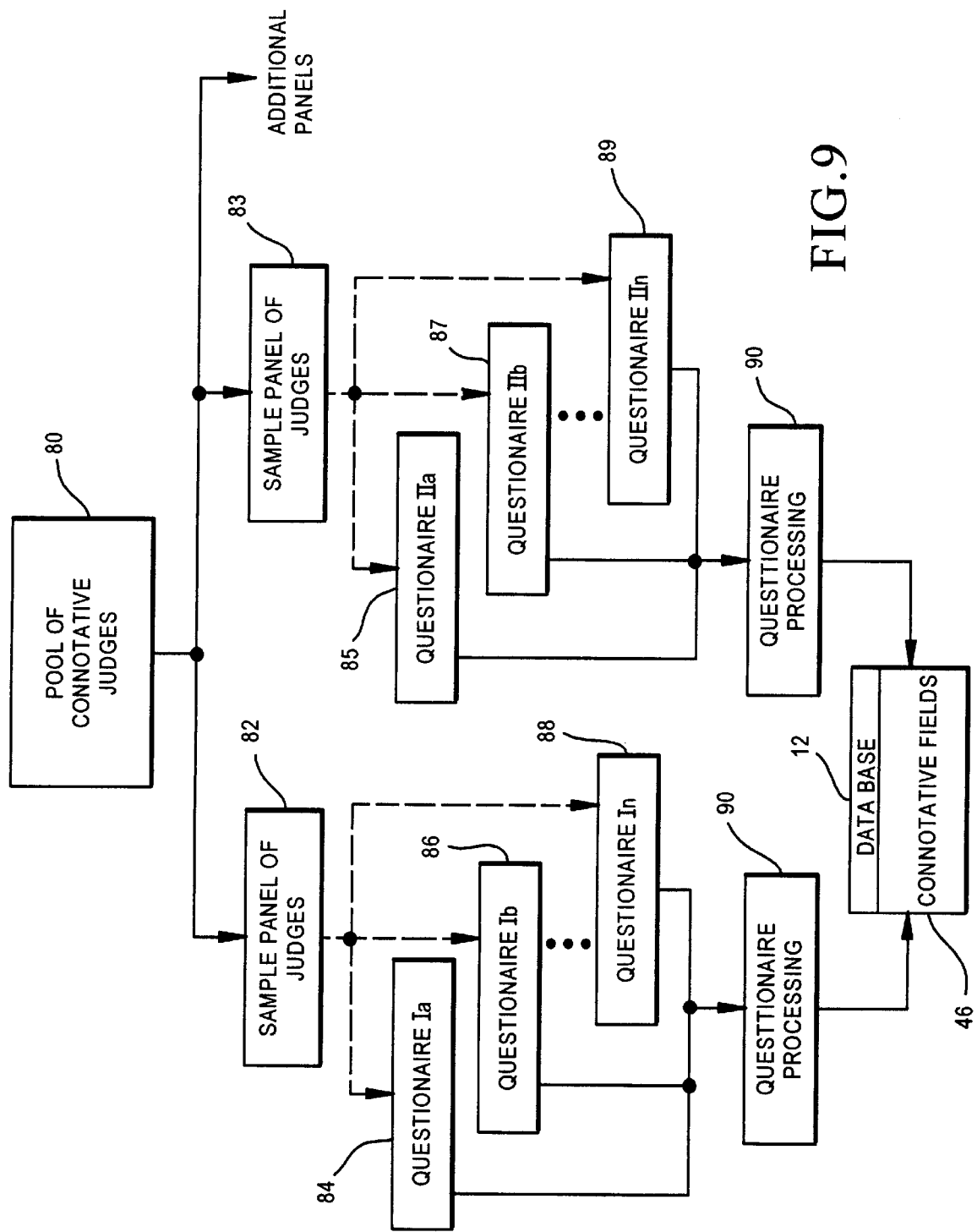
FIG. 9 is a diagram of a system for identifying connotative meanings according to an embodiment of this invention.

Referring to FIG. 9, a pool 80 of connotative judges are recruited to evaluate records of the connotative data base 12 for connotative associations of corresponding words and phrases. A sample of judges from the pool 80 forms a panel 82 used to evaluate a set of records. The same or different panels are formed to evaluate other sets of records. The number of records in a set may vary. For purposes of illustration a panel of 24 judges is described which evaluates a set of 500 records. In a preferred embodiment, each judge typically receives a questionnaire table 84 covering approximately 500 records, each record consisting of the four fields identified in Table 4. The questionnaire also includes instructions for selecting a code number to fill in the blank Field 4 for each record. Each connotative judge is also supplied with one or more of the eight category lists of code-numbered emotional descriptors identified in Table 2. In a preferred embodiment for a given questionnaire each judge is supplied with only one of the eight category lists of emotional descriptors found in Table 2. Thus, in a given questionnaire a judge evaluates the terms for connotative meaning in only a specific emotional category. To complete the questionnaire table, the connotative judge inputs one of three codes or code types for each record in Field 4, as listed in Table 6.

TABLE 6

Coding Alternatives for Capturing SET 2
Connotative Data

1. Code the two-digit number (see Table 2 above) associated with one and only one emotional descriptor that most closely matches the emotional connotation that the connotative judge associates with the word or phrase, considering the denotative context and part of speech.
2. Code "00" if the connotative judge understands the word or phrase and its denotative context, but does not associate any of the emotional descriptors from the supplied list of emotional descriptors with the word or phrase and its denotative context.
3. Code "99" if the connotative judge does not know the word or phrase, or the specific associated denotative context.

In a preferred method of practicing the invention, only one judgment is required for each record in a questionnaire table. However, in other embodiments more than one judgment may be allowed or required, if, for example, one wishes to capture the connotative judge's first choice and also the connotative judge's second choice of emotional descriptor. To effect such data capture, the number of connotative fields 46 (see FIG. 2) would need to be expanded accordingly, and the questionnaire table structure modified to include additional data capture fields.

The connotative judge repeats this procedure for all 500 records in the questionnaire, then returns the completed questionnaire table 84 via the Internet. Thereafter, the judge may receive another questionnaire table 86, or 88 to evaluate. The next questionnaire table received by the connotative judge may contain exactly the same set of records that was just evaluated, but accompanied by a different category list of emotional descriptors to be used for coding. Alternatively, the next questionnaire table may contain a completely different selection of records. The exchange of questionnaire tables continues iteratively for the duration of connotative data collection.

In a preferred embodiment of the invention, each block of 500 records is evaluated in this manner eight times (corresponding to the eight category lists of connotative descriptors listed in Table 2), each time by 24 different connotative judges selected at random from the pool of 100 to 200 available connotative judges, using a judge-selection technique that stratifies sampling to ensure equal representation according to the guidelines summarized in Table 4. Note that the number of judges selected, the size of the pool and the number of records processed in a given questionnaire may vary.

Typically a plurality of panels 82, 83 are formed to evaluate the database 12 records for connotative associations. Different panels 82, 83 receive either the same or different questionnaires 84–89. For the exemplary embodiment where 24 judges evaluate each of 500 records in a given questionnaire, the same 24 judges may or may not evaluate all eight categories of emotional connotations for such 500 records.

Quantifying Intensity of Connotative Meanings

As previously described each judge receives a questionnaire. In one embodiment the questionnaire is in table format. Each record in the table has multiple fields as listed above in Table 5. Fields 1, 2 and 3 are already complete and correspond to the term, a denotative context for such term, and a part of speech. Field 4 is filled in as described above to identify connotative meaning for the word or phrase. Field 5 is to be filled in to record the intensity associated with the connotative meaning provided in Field 4. When a judge indicates that there is no connotative meaning for the word or phrase or that the judge does not know the term or the specific denotative context, then there is no need to quantify an intensity in Field 5. Where a judge is permitted to provide two connotative meanings (e.g., a primary and a secondary connotative meaning) then additional fields are included for each record in the questionnaire (e.g., two fields corresponding to Field 4 and two fields corresponding to Field 5).

Typically a judge quantifies the intensity of the connotative meaning when selecting the connotative meaning itself. The intensity is a scaled value judgement of the judge. Table 7 lists the ratings scale for one embodiment.

TABLE 7

General Coding Model for Capturing Field 5 Data

| 1 | 2 | 3 | 4 | 5 | 6 | 7 |
|---|---|---|---|---|---|---|
| slightly intense | | | | | | very intense |

0=automatically coded, corresponding to '00' code entry in Field 4

9=automatically coded, corresponding to '99' code entry in Field 4

In a preferred embodiment, a guiding set of anchor terms are included which are prerated for intensity. The judge's review of such guiding set improves consistency and accuracy among many judges completing the questionnaires. Specifically, the anchor terms are terms that are associated with scale numbers that represent the average intensity scores that other people have provided for various terms. Each connotative judge is expected to disagree with some of the scores represented by some of the anchor terms. For this reason, connotative judges are instructed to either, (i) highlight only those anchor terms with which they are comfortable, or (ii) alternatively, cross out those anchor terms with which they are uncomfortable. The connotative judge then compares the term he or she is scaling in the questionnaire table with his or her intensity of feeling associated with the anchored scales, choosing the scale number with the closest match.

The anchor terms are representative averages; they do not imply "correctness," but rather provide the connotative judge with indicators of the relative strength of feeling that the connotative judge associates with the chosen emotional descriptor that is meant to be associated with each score number. In effect the anchor terms serve as a way for the judges to calibrate themselves to a scale of intensity. Table 8 presents a typical list of anchor terms associated with a group of emotional descriptors subsumed under the emotional category 'Sadness,' which is one of the eight emotional categories previously described.

TABLE 8

Anchor Terms for Scaling Intensity of Connotative Feeling for the Emotional Category "Sadness"
(NOTE: the numbers 1 through 12 for the anchor words are merely for reference purposes. NO RANK ORDER is implied by the numbering within a scale level.)

SCALE LEVEL 7 (Very Intense Sadness)

1. Holocaust—n the mass murder by the Nazis of the Jews of continental Europe between 1940 and 1945.
2. Auschwitz—n Polish town, site of a Nazi death camp during World War II.
3. child abuse n physical, sexual, or emotional ill-treatment or neglect of a child by parents or other adults.
4. AIDS—n acquired immune (or immuno-) deficiency syndrome.
5. rape victim—n a person who has suffered rape/sexual attack
6. starving person—n a person whose health is deteriorating from lack of food
7. murder—n the unlawful premeditated killing of one human being by another
8. cancer—n malignant growth or tumor; uncontrolled cell division
9. suicide—n the act or an instance of killing oneself intentionally
10. death—n the permanent end of all functions of life
11. blind—adj unable to see; sightless
12. insane—adj mentally deranged; crazy; of unsound mind

SCALE LEVEL 6

1. slave—n a person having no freedom and forced to work for another.
2. abused person—n a person who is maltreated, esp. physically or sexually.
3. leukemia—n an acute or chronic disease characterized by a gross proliferation of leucocytes; cancer of the blood.
4. abandon—v to forsake completely; desert; leave behind
5. child pornography—n sexually explicit writings, pictures, films, etc., of children designed to stimulate sexual excitement.
6. depression—n a mental disorder characterized by extreme gloom, feelings of inadequacy, and inability to concentrate
7. divorce—n the dissolution of a marriage by judgment of a court.
8. starve—v to die or cause to die from lack of food.
9. lonely—adj unhappy as a result of being without the companionship of others
10. heartless—adj unkind or cruel; hard-hearted
11. hurt—adj injured or pained physically or emotionally
12. suicidal—adj involving, indicating, or tending towards suicide

SCALE LEVEL 5

1. beggar—n a person who begs, esp. one who lives by begging.
2. sufferer—n a person who is undergoing pain, punishment, etc.
3. leper—n a person who has leprosy.
4. victimize—v to punish or discriminate against selectively or unfairly.
5. lose—v to be without, as through theft, accident, negligence, etc.
6. degrade—v to reduce in worth, character, etc.; disgrace; dishonor.
7. desert—v to leave or abandon, esp. in violation of a duty, promise.
8. deprive—v to prevent from possessing or enjoying; dispossess (of).
9. alienate—v to cause to become indifferent, unfriendly, or hostile; estrange.
10. demoralize—v to undermine the morale of; dishearten.
11. pain—n emotional, mental, or physical suffering or distress.
12. missing—adj not able to be traced and not known to be dead.

SCALE LEVEL 4

1. inmate—n a person confined to an institution such as a prison or hospital.
2. drunkard—n a person who is frequently or habitually drunk.
3. addict—n a person who is addicted, esp. to narcotic drugs.
4. haunt—v to intrude upon or recur to (the memory, thoughts, etc.)
5. condemn—v to express strong disapproval of; censure.
6. refuse—v to decline to accept (something offered).
7. skid row—n a dilapidated section of a city inhabited by vagrants, etc.

8. hopeless—adj having or offering no hope.
9. alone—adj apart from another or others; solitary.
10. persecuted—adj oppressed, harassed, or maltreated.
11. unemployed—adj without remunerative employment; out of work.
12. deformed—adj disfigured or misshapen.

SCALE LEVEL 3

1. wino n a person who habitually drinks wine as a means of getting drunk.
2. wretch n a person pitied for their misfortune.
3. tracks n needle marks on the skin of an injection drug user.
4. ostracize v to exclude or banish (a person) from a particular group, society.
5. forsake v to give up (something valued or enjoyed).
6. jail n a place for the confinement of prisoners.
7. lonely adj unhappy as a result of being without companionship of others.
8. hungry adj experiencing pain, weakness, or nausea through lack of food.
9. rejected adj not accepted, acknowledged, used, believed, etc.
10. pitiful adj arousing or deserving sympathy or sorrow.
11. helpless adj unable to manage independently.
12. let down adj unfulfilled in expectations ; disappointed.

SCALE LEVEL 2

1. drop-out—n a student who fails to complete a school or college course.
2. lush—n a heavy drinker, esp. an alcoholic.
3. underestimate—v to think insufficiently highly of.
4. flophouse—n a cheap lodging house, esp. one used by tramps.
5. God Bless the Child—n a song written by Billie Holiday and Arthur Herzog.
6. homesick—adj depressed or melancholy at being away from home and family.
7. lost—adj confused, bewildered, or helpless.
8. empty—adj without purpose, substance, or value.
9. heavy hearted—adj sad; melancholy.
10. disenchanted—adj disillusioned.
11. unlucky—adj characterized by misfortune or failure.
12. blue—adj depressed, moody, or unhappy.

SCALE LEVEL 1 (Light Sadness)

1. wallflower—n a person who stays on the fringes of a dance or party.
2. gambler—n a person who risks or bets (money) on games, sports, etc.
3. orphan—n a child, one or (more commonly) both of whose parents are dead.
4. runaway—n a person who takes flight or escapes.
5. dim—v to cause to seem less bright, as by comparison.
6. coal mine—n a system of excavations made for the extraction of coal.
7. mobile home—n living quarters mounted on wheels and capable of being towed.
8. Monday—n the second day of the week; first day of the working week.
9. comb-over—n a hairstyle in which long hair from the fringes of the scalp is arranged to cover and hide a bald portion of the scalp.
10. colorless—adj grey or pallid in tone or hue.
11. indifferent—adj showing no care or concern; uninterested.
12. resigned—adj acquiescent or submissive.

A judge looks at each anchor term for a given rating in a given emotional category of the categories listed in Table 2. The judge selects one or more anchor terms under a given rating for a given emotional category which the judge feels most closely relates to the intensity rating subjectively felt by the judge.

In a preferred embodiment, the anchor terms are updated over time based upon many judges' response entries into Field 5 for each record. In particular the Field 4 and 5 entries are analyzed to identify terms which consistently are judged by many different judges to have the same connotative meaning and the same intensity. Such terms become reliable anchor terms. This is done on an ongoing basis in order to build up a large, reliable database of anchor terms.

As indicated above, an 8-point scale (including zero, indicating absence of the specified connotative feeling) is used to capture data for Field 5 in a preferred embodiment of the invention. However anchored scales of smaller or larger size, such a 3, 5, or 9 point scales may be used. Also, the number of anchor words or phrases may be greater than the 12 used in the preferred method, or fewer than 12. The number of anchor terms should be large enough to allow a choice permitting the connotative judge to select only those with which he or she is comfortable.

The connotative judge repeats the above steps to input data for Fields 4 and 5 for all records in the questionnaire, then returns the completed questionnaire table via the Internet, then receives another questionnaire table to evaluate. The next questionnaire table received by the connotative judge may contain exactly the same set of terms that was just evaluated, but accompanied by a different list of emotional descriptors to be used for coding Field 4, and a correspondingly different set of anchors for coding Field 5. Alternatively, the next questionnaire table may contain a completely different selection of terms, with a corresponding emotional descriptor list for Field 4 and an anchor term list for Field 5. The exchange of questionnaire tables continues iteratively for the duration of connotative data collection.

In a preferred embodiment of the invention, each block of 500 records is evaluated in this manner eight times, corresponding to eight emotional categories, each time by 24 different connotative judges. In this manner, a full-language dictionary database in any language, associating every context of every word with a very broad range of identified emotional connotations and their individual intensity levels, is constructed.

Data Integrity

Comparatively analyzing the connotative data associated with each block of records being processed serves to check for data integrity. Checking the data for integrity is part of an automated questionnaire processing function 90 (see FIG. 8). An initial integrity processing step is to determine whether any of the 24 sets of data should be rejected as invalid because of anomalous data. This is accomplished by statistically comparing the score set of each individual judge with the combined score sets of the other 23 judges who evaluated the same set of words using the same lists of emotional descriptors. If the scores between any given judge's data and the aggregate data of the other judges in the panel are not statistically related, then the data set for the anomalous judge is rejected. Anomalous data may arise if, for example, a connotative judge is filling in random data to avoid the mental work involved in providing genuine connotative data, or if a judge is coding a large number of double zeros and ninety-nines, or if a judge's experience is so far out of the mainstream that his or her connotative associations are not representative of the larger population. In a preferred method of practicing the invention, a minimum correlation level of 0.6 is used as a data rejection threshold.

Further analysis includes determining how many valid non-zero scores remain after purging invalid scores and after accounting for 00 and 99 scores. A determination is then made to ascertain which emotional connotations the judges most often associate with each word or phrase. This is a function of four factors:

1. The number of valid scores remaining after data purging;
2. The number of emotional connotative descriptors in the list the judges had to choose from;
3. The number of judges who selected the same emotional descriptor; and
4. The probability that the same emotional descriptor was selected by more than one judge merely by chance.

The multinomial probability distribution below in equation (I) embodies the above factors:

$$P(y) = \frac{n!}{y!(n-y)!} * p^y q^{n-y} \qquad (I)$$

where:

n is the total number of independent connotative judges evaluating the record;

y is the number of judges selecting a particular emotional descriptor;

p is the probability of the emotional descriptor being selected if the selection occurs by chance;

q is the probability of an emotional descriptor being excluded if the selection occurs by chance; and P(y) is the probability of the emotional descriptor being selected by y judges if the selections occurred by chance.

Tables may be constructed of the probabilities P(y) of connotative judges independently selecting the same emotional descriptors by chance for various panel sizes (e.g., increasing incrementally up to 24, and/or additional panel sizes of 36, 72, 96, 120 or any other panel size), and emotional connotative descriptors available for selection (e.g., increasing incrementally up to 24, with additional category group sizes of 36, 72, 96, 120 or other corresponding group size).

As an example, consider the following set of connotative judgments for one word evaluated by 24 connotative judges on the Amusement/Excitement emotional category, which subsumes 16 emotional descriptors. The total number of valid judgments after purging is 21 (Table 9).

TABLE 9

Example of Field 4 and 5 Questionnaire Table Scores

| Emotional Descriptors | Field 4 "Votes" Received from Connotative Judges | Field 5 Intensity Scores |
|---|---|---|
| Amazement | 0 | |
| Amusement | 3 | 5, 3, 5 |
| Astonishment | 0 | |
| Eagerness | 2 | 5, 4 |
| Enthusiasm | 0 | |
| Excitement | 1 | 4 |
| Exhilaration | 1 | 5 |

TABLE 9-continued

Example of Field 4 and 5 Questionnaire Table Scores

| Emotional Descriptors | Field 4 "Votes" Received from Connotative Judges | Field 5 Intensity Scores |
|---|---|---|
| Exuberance | 1 | 4 |
| Fun | 0 | |
| Glee | 5 | 3, 4, 6, 4, 4 |
| Hilarity | 3 | 4, 4, 5 |
| Meriment | 1 | 5 |
| Mirth | 3 | 6, 4, 5 |
| Surprise | 0 | |
| Thrill | 1 | 4 |
| Wonder | 0 | |

The associated probabilities of chance selection of the same emotional descriptor by independent connotative judges, according to equation (I), are as follows:

| Number of Judges Selecting the Same Category | Probability of Chance Selection |
|---|---|
| 0 | 0.258 |
| 1 | 0.361 |
| 2 | 0.241 |
| 3 | 0.102 |
| 4 | 0.030 |
| 5 | 0.007 |

In this example, only one emotional descriptor, "Glee," has been selected by enough independent connotative judges (5 judges) to meet the test of statistical significance, and is retained in the main database 12 as a connotative association for the term being evaluated. For any given term, selection of emotional descriptors from one emotional category does not preclude selection of emotional descriptors from other emotional categories. Any given term is apt to evoke several kinds of emotional response simultaneously. Therefore, the same term is also evaluated in an identical manner on the other seven categories of emotional connotations listed in Table 2. Thus, the term may, or may not, finish with more connotative emotional descriptors added when the data collection procedure has been completed.

In a preferred embodiment of the invention, terms that receive no votes from the connotative judges on any of the connotative groupings, or too few votes on all eight connotative groupings to meet the test of statistical significance, are tagged as "non-connotative," so that such terms may be optionally excluded from further analysis or database querying.

As for connotative intensity, all 21 scores in the above example are valid, not just the 5 scores for the specific emotional descriptor "Glee," because the 21 Field-5 scores represent the general emotional category, "Amusement/Excitement," which subsumes the specific emotional descriptor, "Glee."

By completion of data analysis, each of the eight emotional variables contains one mean (i.e., average) intensity score for each word or phrase. An unbiased estimate of the variance of the sample of 21 anchored intensity scores in Table 9 is calculated according to the following variance formula:

$$s^2 = \frac{\sum(X - \overline{X})^2}{(n-1)}$$

from which the standard error of the mean for the sample is estimated in accordance with the following formula:

$$s_{\overline{X}} = \frac{s}{\sqrt{n}}$$

where:
- X is an independent connotative judge's score
- $\overline{X}$ is the sample mean
- n is the number of scores in the sample
- $s^2$ is an unbiased estimate of the variance of the sample
- s is the sample standard deviation
- $s_{\overline{X}}$ is the standard error of the mean.

In the present example, the average of the 21-score sample of Field-5 data presented in Table 9 is 4.4. The standard deviation of the 21-score sample is approximately 0.81, which, when divided by 21 yields a standard error of the mean of about 0.177, for a 95% confidence level about the mean of ±0.35. Further accuracy is obtained by programming the computer to identify and purge "outlier" scores. This is accomplished by comparing each score with the mean and purging scores that are higher or lower than a statistically specified distance from the mean.

In a preferred embodiment of the invention, terms that receive no Field-4 emotional descriptor votes from the connotative judges on any of the eight emotional categories (and therefore no Field-5 intensity scores) are tagged as "non-connotative," so that, at the user's option, such words may be excluded from further analysis or database querying.

Identifying Human Interest Area Relating to a Record

The Human Interest fields 48 may be defined in the same manner as the Field 4 data of Table 5. However, because the human interest fields are less subjective and relate more directly to denotative context, in a preferred embodiment assigned editors are used to define most of the human interest fields. However several variables on the Table 3 list of human interest fields, such as the miscellaneous fields for "Abstract-Concrete," "Power," and "Activity" are better left to evaluation by panels of connotative judges. These fields are defined as described above for the field 4 data and are subject to the same or similar data integrity procedures.

A preferred embodiment of the invention such as the one described herein is both human-judgment based and dynamic, reflecting the human and dynamic nature of language. Since the data provided by the connotative judges are key to the system and method, one may wish to establish a program of continuous update of the database, either at prescribed intervals or on an ongoing basis, such as through a World Wide Web site. In this way, connotative judges would be able to supply data continuously, with turnover of connotative judges easily managed, and the database, particularly the connotative component, kept completely up to date allowing for new or changing connotative associations.

In one embodiment participating judges periodically or aperiodically receive a mini-database via e-mail or by logging onto a web site. The mini-database serves as the questionnaire allowing the judge to enter a code for the connotative association (see table 6) for a given emotional category (see table 2). The results are then processed as described above for data integrity (see questionnaire processing 90 of FIG. 8 and related description).

By practicing the above method and system of the present invention, a complete and accurate connotative language reference database 12 is constructed in any language, which then can be used to construct interactive connotative language reference tools, such as connotative dictionaries, connotative thesauruses, and connotative text analysis tools.

Meritorious and Advantageous Effects

One advantage of the system for identifying connotative meanings is that reliable associations, including connotative descriptions and intensities, are identified for given words and phrases in each of their denotative contexts. Another advantage is that the associations are maintained over time with changes in the vernacular or other changes/occurrences affecting connotative association.

Another advantage of the invention is that an author, editor or another is able to automatically analyze the discourse to view the connotative aspects of the work. Such author editor or another interested party then can go back and alter the choice of some words, phrases, or even passages to fit more closely to a desired connotative profile desired for the discourse. In particular, by iteratively editing and analyzing the discourse a more desirable and effective discourse can be obtained for a given target audience.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for analyzing a passage of discourse for connotative information, comprising the steps of:

identifying terms in the discourse which correspond to an entry in a database of terms, the database having a plurality of records, each record corresponding to a term of the data base and including:
  - a first field identifying the term for the corresponding record;
  - a second field for identifying a denotative context for the term in the first field;
  - a plurality of connotative fields, each one of the plurality of connotative fields storing a code corresponding to one selection of a plurality of predefined connotations, the plurality of predefined connotations comprising an indicator of no connotative association and a plurality of sets of emotional descriptors, each one set of the plurality of sets corresponding to a mutually exclusive one emotional category of a plurality of emotional categories;

the method further comprising the step of accumulating a respective tally for each one of a plurality of predefined connotations that is associated with the terms identified in the passage.

2. The method of claim 1, in which there are a plurality of tallies accumulated in the accumulating step and further comprising the step of combining the respective tallies of predefined connotations which correspond to a common emotional category for each one of the plurality of emotional categories.

3. The method of claim 2, further comprising the step of displaying a rating of emotion in which the rating is based upon the combined tallies.

4. The method of claim 2, further comprising the steps of:
displaying a rating of positive emotions in which the rating is based upon the combined tallies; and
displaying a rating of negative emotions in which the rating is based upon the combined tallies.

5. The method of claim 1, in which there are a plurality of tallies accumulated in the accumulating step and further comprising the step of displaying a set of dominant connotations selected from the plurality of predefined connotations based upon the respective tallies.

6. The method of 5, in which the set of dominant connotations is displayed according to a categorization of the displayed connotations.

7. The method of claim 1, further comprising the step of:
tracking the number of occurrences of terms identified in the passage that are associated with an emotional descriptor among the plurality of sets of emotional descriptors.

8. The method of claim 1, further comprising the step of:
evaluating the passage for use of terms identifying people; and
displaying a rating of human interest which is based upon the evaluation for use of terms identifying people.

9. The method of claim 8, further comprising the step of:
displaying a list of dominant terms identified in the passage which relate to people.

10. The method of claim 1, in which each record corresponding to a term of the data base further includes:
a power field for identifying a power rating associated with the term in the first field;
the method further comprising the steps of:
deriving an average power rating for the identified terms of the passage; and
displaying a power rating for the passage which is based upon the derived average power rating.

11. The method of claim 10, further comprising the step of:
displaying a list of terms which most impact the power rating for the passage.

12. The method of claim 1, in which each record corresponding to a term of the data base further includes:
an activity field for identifying an activity rating associated with the term in the first field;
the method further comprising the steps of:
deriving an average activity rating for the identified terms of the passage; and
displaying an activity rating for the passage which is based upon the derived average activity rating.

13. The method of claim 12, further comprising the step of:
displaying a list of terms which most impact the activity rating for the passage.

14. The method of claim 1, in which each record corresponding to a term of the data base further includes:
a field for identifying a rating along a scale of abstractness to concreteness associated with the term in the first field;
the method further comprising the steps of:
deriving an average rating of abstractness versus concreteness for the identified terms of the passage; and
displaying a rating of abstractness versus concreteness for the passage which is based upon the derived average rating of abstractness versus concreteness.

15. The method of claim 14, further comprising the step of:
displaying a list of terms which most impact the rating of abstractness versus concreteness for the passage.

16. The method of claim 1, further comprising the step of:
determining a percentage of words in the passage for which there is a corresponding term in the data base having an associated emotional descriptor from among the plurality of sets of emotional descriptors.

17. The method of claim 1, further comprising the step of:
determining a percentage of words in the passage which are among a set of core words for a language in which the passage is written.

18. The method of claim 1, in which the respective tallies are of emotional categories, and wherein the step of accumulating comprises accumulating the respective tally by emotional category for each one of a plurality of predefined connotations that is associated with the terms identified in the passage.

19. A computer system for executing a computer program which analyzes a passage of discourse for connotative information, the system comprising:
a data base having a plurality of records, each record including:
a first field identifying the term for the corresponding record;
a second field for identifying a denotative context for the term in the first field; and
a plurality of connotative fields, each one of the plurality of connotative fields storing a code corresponding to one selection of a plurality of predefined connotations, the plurality of predefined connotations comprising an indicator of no connotative association and a plurality of sets of emotional descriptors, each one set of the plurality of sets corresponding to a mutually exclusive one emotional category of a plurality of emotional categories;
the system further comprising:
means for identifying terms in the discourse which correspond to an entry in a database of terms;
means for accumulating a respective tally for each one of a plurality of predefined connotations that is associated with the terms identified in the passage.

20. The system of claim 19, in which the respective tallies are of emotional categories, and wherein the accumulating means accumulates the respective tally by emotional category for each one of the plurality of predefined connotations that is associated with the terms identified in the passage.

21. The system of claim 19, in which there are a plurality of tallies accumulated in the accumulating step and further comprising the step of combining the respective tallies of predefined connotations which correspond to a common emotional category for each one of the plurality of emotional categories.

22. The system of claim 21, further comprising means for displaying a rating of emotion in which the rating is based upon the combined tallies.

23. The system of claim 21, further comprising:
means for displaying a rating of positive emotions in which the rating is based upon the combined tallies; and
means for displaying a rating of negative emotions in which the rating is based upon the combined tallies.

24. The system of claim 19, in which there are a plurality of tallies accumulated by the accumulating means and further comprising means for displaying a set of dominant connotations selected from the plurality of predefined connotations based upon the respective tallies.

25. The system of 24, in which the set of dominant connotations is displayed according to a categorization of the displayed connotations.

26. The system of claim 19, further comprising means for tracking the number of occurrences of terms identified in the passage that are associated with an emotional descriptor among the plurality of sets of emotional descriptors.

27. The system of claim 19, further comprising:
means for evaluating the passage for use of terms relating to people; and
means for displaying a rating of human interest which is based upon the evaluation for use of terms relating to people.

28. The system of claim 27, further comprising means for displaying a list of dominant terms identified in the passage which relate to people.

29. The system of claim 19, in which each record corresponding to a term of the data base further includes:
a power field for identifying a power rating associated with the term in the first field;
the system further comprising:
means for deriving an average power rating for the identified terms of the passage; and
means for displaying a power rating for the passage which is based upon the derived average power rating.

30. The system of claim 29, further comprising means for displaying a list of terms which most impact the power rating for the passage.

31. The system of claim 19, in which each record corresponding to a term of the data base further includes:
an activity field for identifying an activity rating associated with the term in the first field;
the system further comprising:
means for deriving an average activity rating for the identified terms of the passage; and
means for displaying an activity rating for the passage which is based upon the derived average activity rating.

32. The system of claim 31, further comprising means for displaying a list of terms which most impact the activity rating for the passage.

33. The system of claim 19, in which each record corresponding to a term of the data base further includes:
a field for identifying a rating along a scale of abstractness to concreteness associated with the term in the first field;
the system further comprising:
means for deriving an average rating of abstractness versus concreteness for the identified terms of the passage; and
means for displaying a rating of abstractness versus concreteness for the passage which is based upon the derived average rating of abstractness versus concreteness.

34. The system of claim 33, further comprising means for displaying a list of terms which most impact the rating of abstractness versus concreteness for the passage.

35. The system of claim 19, further comprising means for determining a percentage of words in the passage for which there is a corresponding term in the data base having an associated emotional descriptor from among the plurality of sets of emotional descriptors.

36. The system of claim 19, further comprising means for determining a percentage of words in the passage which are among a set of core words for a language in which the passage is written.

37. A computer readable storage medium for storing a connotative language reference, comprising a data base and computer executable code means of instructions, the data base comprising a plurality of records, each record including:
a first field identifying the term for the corresponding record;
a second field for identifying a denotative context for the term in the first field;
a plurality of connotative fields, each one of the plurality of connotative fields storing a code corresponding to one selection of a plurality of predefined connotations, the plurality of predefined connotations comprising an indicator of no connotative association and a plurality of sets of emotional descriptors, each one set of the plurality of sets corresponding to a mutually exclusive one emotional category of a plurality of emotional categories;
the computer executable code means comprising:
code means for identifying terms in the discourse which correspond to an entry in a database of terms; and
code means for accumulating a respective tally for each one of a plurality of predefined connotations that is associated with the terms identified in the passage.

38. The medium of claim 37, in which the respective tallies are of emotional categories, and wherein the accumulating code means is for accumulating the respective tally by emotional category for each one of the plurality of predefined connotations that is associated with the terms identified in the passage.

39. The medium of claim 37, in which there are a plurality of tallies accumulated by the accumulating code means and further comprising code means for combining the respective tallies of predefined connotations which correspond to a common emotional category for each one of the plurality of emotional categories.

40. The medium of claim 39, further comprising code means for displaying a rating of emotion in which the rating is based upon the combined tallies.

41. The medium of claim 39, further comprising:
code means for displaying a rating of positive emotions in which the rating is based upon the combined tallies; and
code means for displaying a rating of negative emotions in which the rating is based upon the combined tallies.

42. The medium of claim 37, in which there are a plurality of tallies accumulated by the accumulating code means and further comprising code means for displaying a set of dominant connotations selected from the plurality of predefined connotations based upon the respective tallies.

43. The medium of claim 37, further comprising:
code means for tracking the number of occurrences of terms identified in the passage that are associated with an emotional descriptor among the plurality of sets of emotional descriptors.

44. The method of claim 1, further comprising the step of:

displaying an analysis message pertaining to the discourse based upon the accummulated respective tallies.

45. The method of claim 1, further comprising the steps of:

identifying an analysis message among a plurality of predefined analaysis messages based upon the accummulated respective tallies; and displaying the identified analysis message.

46. The system of claim 19, in which the data base is a first data base, the system further comprising:

a second data base of predefined analytical messages; and means for selecting a predefined analytical message from the second data base to display based upon the accummulated respective tallies.

47. The medium of claim 37, in which the data base is a first data base, the medium further comprising a second data base of predefined analytical messages, the computer executable code means further comprising means for selecting a predefined analytical message from the second data base to display based upon the accummulated respective tallies.

* * * * *